US012794634B2

(12) United States Patent
Manolakos et al.

(10) Patent No.: US 12,794,634 B2
(45) Date of Patent: Nov. 10, 2026

(54) MITIGATING FREQUENCY-DOMAIN SYMBOL-LEVEL ATTACKS ON POSITIONING REFERENCE SIGNALS

(71) Applicant: QUALCOMM Incorporated, San Diego, CA (US)

(72) Inventors: Alexandros Manolakos, Athens (GR); Weimin Duan, San Diego, CA (US); Ahmed Elshafie, San Diego, CA (US); Aziz Gholmieh, Del Mar, CA (US); Soo Bum Lee, San Diego, CA (US); Gavin Bernard Horn, LaJolla, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 241 days.

(21) Appl. No.: 18/691,678

(22) PCT Filed: Aug. 5, 2022

(86) PCT No.: PCT/US2022/074600
§ 371 (c)(1),
(2) Date: Mar. 13, 2024

(87) PCT Pub. No.: WO2023/049555
PCT Pub. Date: Mar. 30, 2023

(65) Prior Publication Data

US 2024/0396689 A1 Nov. 28, 2024

(30) Foreign Application Priority Data

Sep. 22, 2021 (GR) .............................. 20210100627

(51) Int. Cl.

| | |
|---|---|
| ***H04L 5/00*** | (2006.01) |
| ***H04W 12/122*** | (2021.01) |
| ***H04W 28/02*** | (2009.01) |

(52) U.S. Cl.
CPC .......... *H04L 5/0051* (2013.01); *H04L 5/0007* (2013.01); *H04W 12/122* (2021.01); *H04W 28/0268* (2013.01)

(58) Field of Classification Search
CPC ... H04W 12/122; H04W 64/00; H04W 12/63; H04W 12/104; H04W 72/231;
(Continued)

(56) References Cited

U.S. PATENT DOCUMENTS

2019/0297489 A1 9/2019 Lei et al.
2020/0322805 A1* 10/2020 Wang .................... H04W 88/10
2023/0379662 A1* 11/2023 Fraunholz ............. G01S 5/0215

FOREIGN PATENT DOCUMENTS

WO WO-2022081125 A1 4/2022

OTHER PUBLICATIONS

3GPP TR 38.857 V17.0.0 (Mar. 2021): "3GPP, TSG RAN, Study on NR Positioning Enhancements, (Release 17)", R2-2106596, 3GPP, Mobile Competence Centre, 650, Route Des Lucioles, F-06921 Sophia-Antipolis Cedex, France, May 31, 2021, 130 Pages, XP052022899, p. 8, Paragraph 1, p. 19, Paragraph 7-p. 20, Paragraph 8, p. 90, Paragraph 9-p. 100, Paragraph 9.3.1.1.5, p. 105, Paragraph 10.2, p. 107, Paragraph 11-p. 108.
(Continued)

*Primary Examiner* — Olumide Ajibade Akonai
(74) *Attorney, Agent, or Firm* — Muncy, Geissler, Olds & Lowe, P.C.

(57) ABSTRACT

Disclosed are techniques for wireless positioning. In an aspect, a network node transmits, to a network entity, a request for transmission of one or more first positioning reference signals (PRS) resources having one or more physical layer security properties, and measures the one or more first PRS resources having the one or more physical layer security properties. In an aspect, a network entity receives,
(Continued)

from a first network node, a request for transmission of one or more first positioning reference signals (PRS) resources having one or more physical layer security properties, and transmits, to a second network node, a request for the second network node to transmit the one or more first PRS resources having the one or more physical layer security properties to the first network node.

25 Claims, 16 Drawing Sheets

(58) Field of Classification Search
CPC ..... H04W 4/029; H04W 12/04; H04W 12/06; H04W 12/03; H04W 12/041; H04W 12/043; H04W 12/121; H04W 64/003; H04W 12/00; H04W 12/069; H04W 12/106; H04W 12/108; H04L 5/0048; H04L 63/0428; H04L 63/0823; H04L 63/12; H04L 63/08; H04L 5/0051; H04L 63/0442; H04L 27/26025
See application file for complete search history.

(56) References Cited

OTHER PUBLICATIONS

International Search Report and Written Opinion—PCT/US2022/074600—ISA/EPO—Oct. 19, 2022.

* cited by examiner

MITIGATING FREQUENCY-DOMAIN SYMBOL-LEVEL ATTACKS ON POSITIONING REFERENCE SIGNALS

CROSS-REFERENCE TO RELATED APPLICATIONS

The present Application for Patent claims the benefit of GR Application No. 20210100627, entitled "MITIGATING FREQUENCY-DOMAIN SYMBOL-LEVEL ATTACKS ON POSITIONING REFERENCE SIGNALS", filed Sep. 22, 2021, and is a national stage application, filed under 35 U.S.C. § 371, of International Patent Application No. PCT/US2022/074600, entitled, "MITIGATING FREQUENCY-DOMAIN SYMBOL-LEVEL ATTACKS ON POSITIONING REFERENCE SIGNALS", filed Aug. 5, 2022, both of which are assigned to the assignee hereof and are expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data. Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless positioning performed by a network node includes transmitting, to a network entity, a request for transmission of one or more first positioning reference signals (PRS) resources having one or more security properties; and measuring the one or more first PRS resources having the one or more security properties.

In an aspect, a method of communication performed by a network entity includes receiving, from a first network node, a request for transmission of one or more first positioning reference signals (PRS) resources having one or more security properties; and transmitting, to a second network node, a request for the second network node to transmit the one or more first PRS resources having the one or more security properties to the first network node.

In an aspect, a network node includes a memory; at least one transceiver; and at least one processor communicatively coupled to the memory and the at least one transceiver, the at least one processor configured to: transmit, via the at least one transceiver, to a network entity, a request for transmission of one or more first positioning reference signals (PRS) resources having one or more physical layer security properties; and measure the one or more first PRS resources having the one or more physical layer security properties.

In an aspect, a network entity includes a memory; at least one transceiver; and at least one processor communicatively coupled to the memory and the at least one transceiver, the at least one processor configured to: receive, via the at least one transceiver, from a first network node, a request for transmission of one or more first positioning reference signals (PRS) resources having one or more physical layer security properties; and transmit, via the at least one transceiver, to a second network node, a request for the second network node to transmit the one or more first PRS resources having the one or more physical layer security properties to the first network node.

In an aspect, a network node includes means for transmitting, to a network entity, a request for transmission of one or more first positioning reference signals (PRS) resources having one or more physical layer security properties; and means for measuring the one or more first PRS resources having the one or more physical layer security properties.

In an aspect, a network entity includes means for receiving, from a first network node, a request for transmission of one or more first positioning reference signals (PRS) resources having one or more physical layer security properties; and means for transmitting, to a second network node, a request for the second network node to transmit the one or more first PRS resources having the one or more physical layer security properties to the first network node.

In an aspect, a non-transitory computer-readable medium stores computer-executable instructions that, when executed by a network node, cause the network node to: transmit, to a network entity, a request for transmission of one or more first positioning reference signals (PRS) resources having one or more physical layer security properties; and measure the one or more first PRS resources having the one or more physical layer security properties.

In an aspect, a non-transitory computer-readable medium stores computer-executable instructions that, when executed by a network entity, cause the network entity to: receive, from a first network node, a request for transmission of one or more first positioning reference signals (PRS) resources having one or more physical layer security properties; and transmit, to a second network node, a request for the second network node to transmit the one or more first PRS resources having the one or more physical layer security properties to the first network node.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
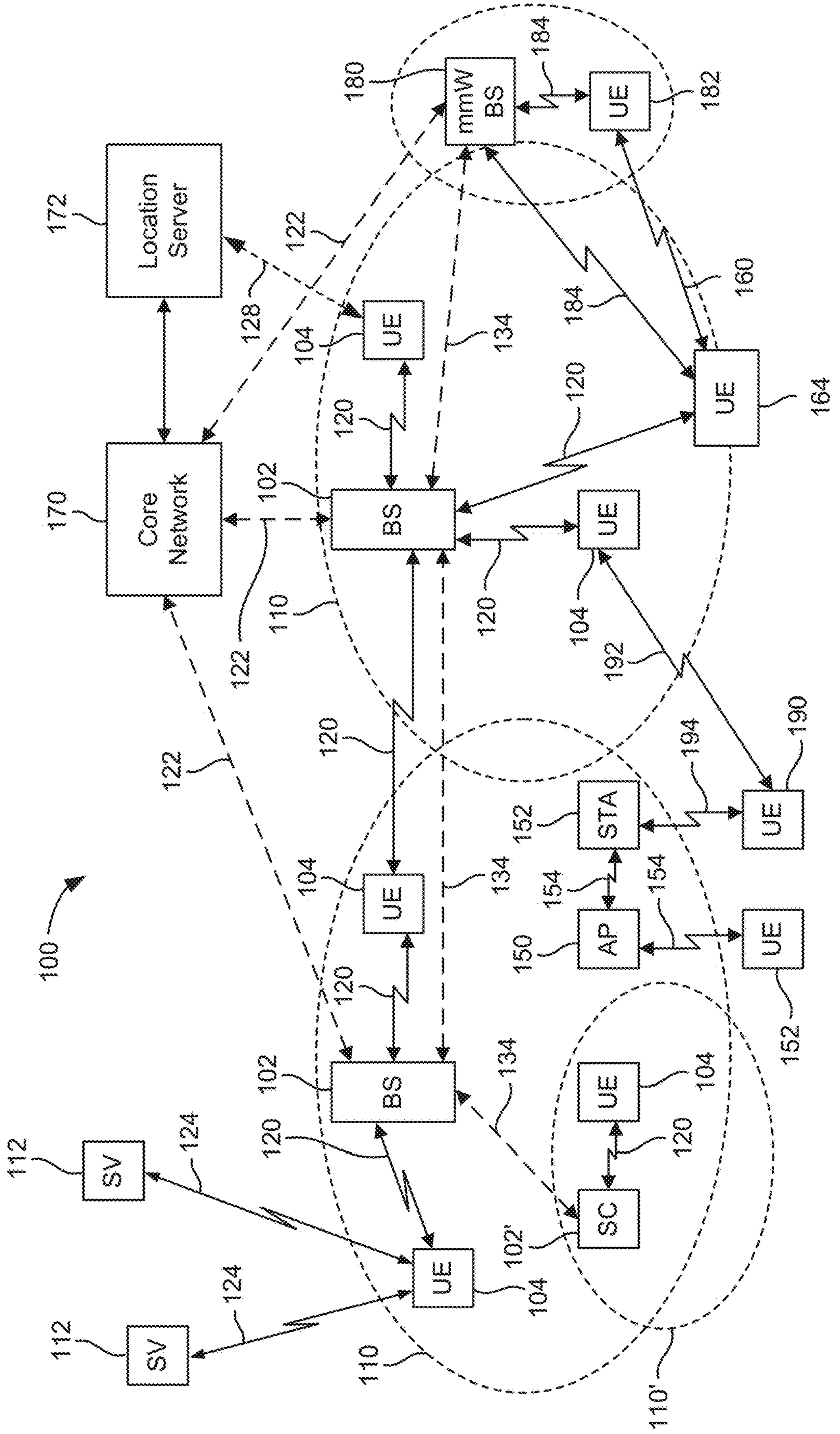
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station." or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term “cell” may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled “SC” for “small cell”) may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range.

Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a “phased array” or an “antenna array”) that creates a beam of RF waves that can be “steered” to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4*a* or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-*a* or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®—, and so on.

Figure 2A:
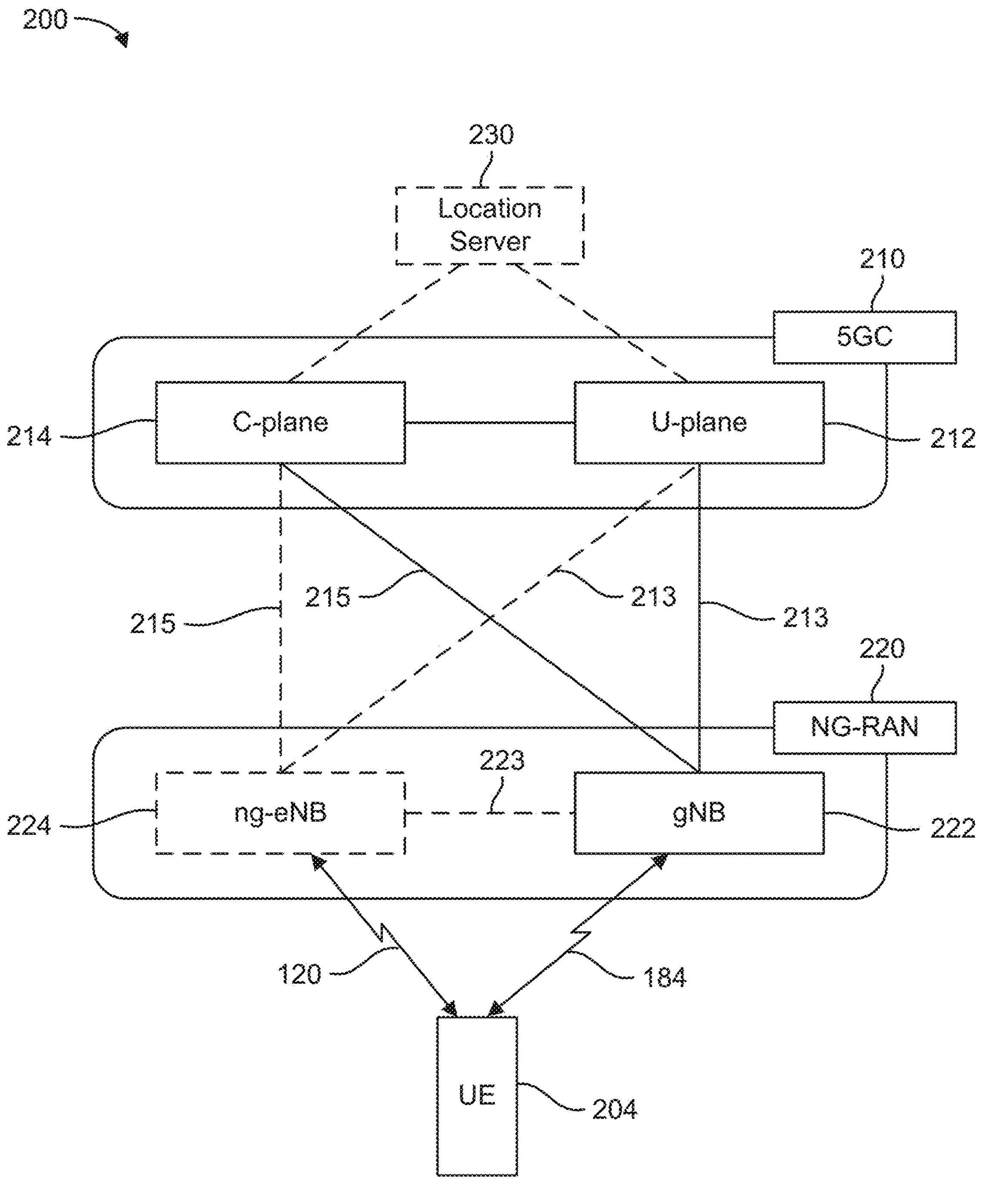
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222.

Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
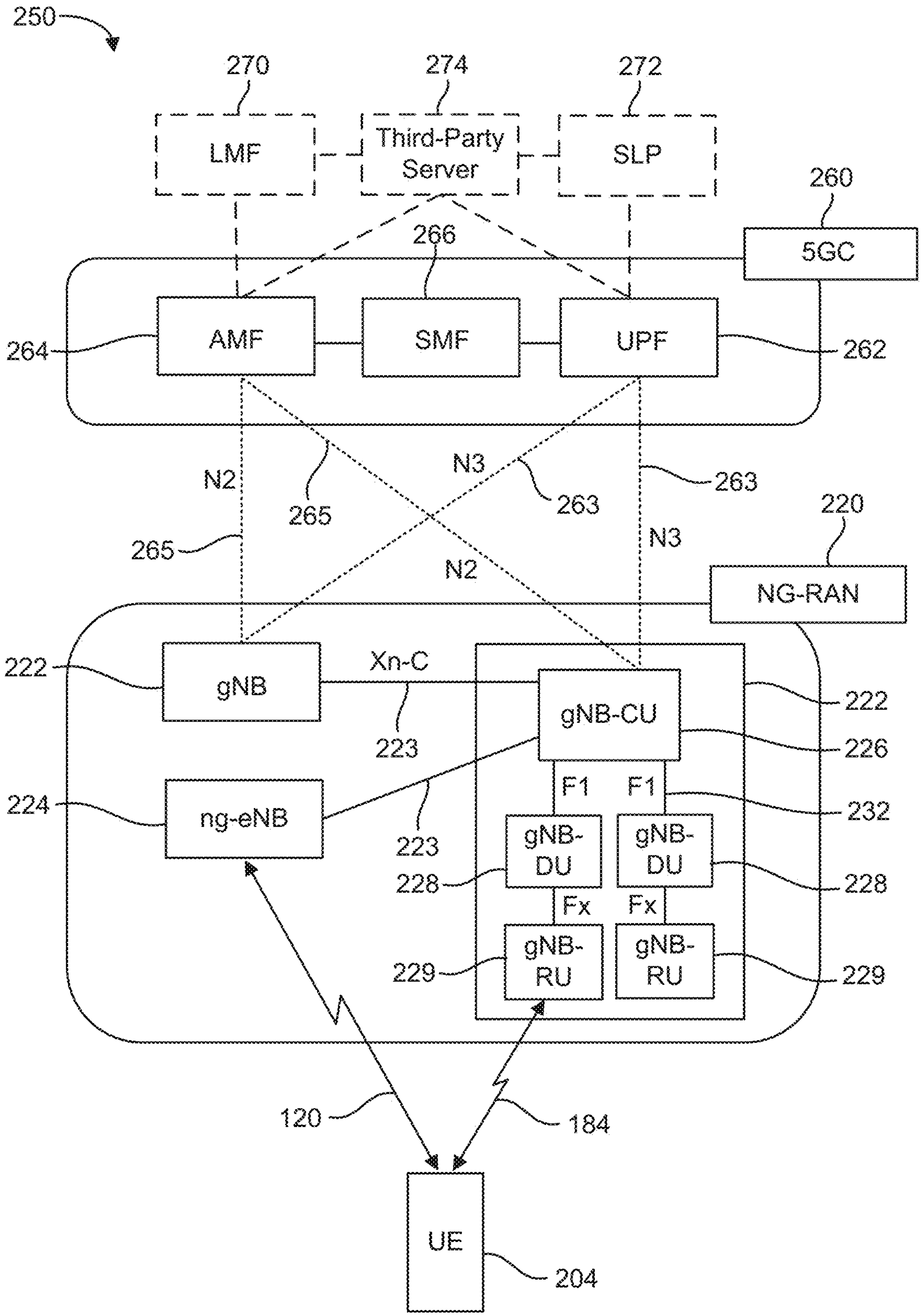

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions oftransferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
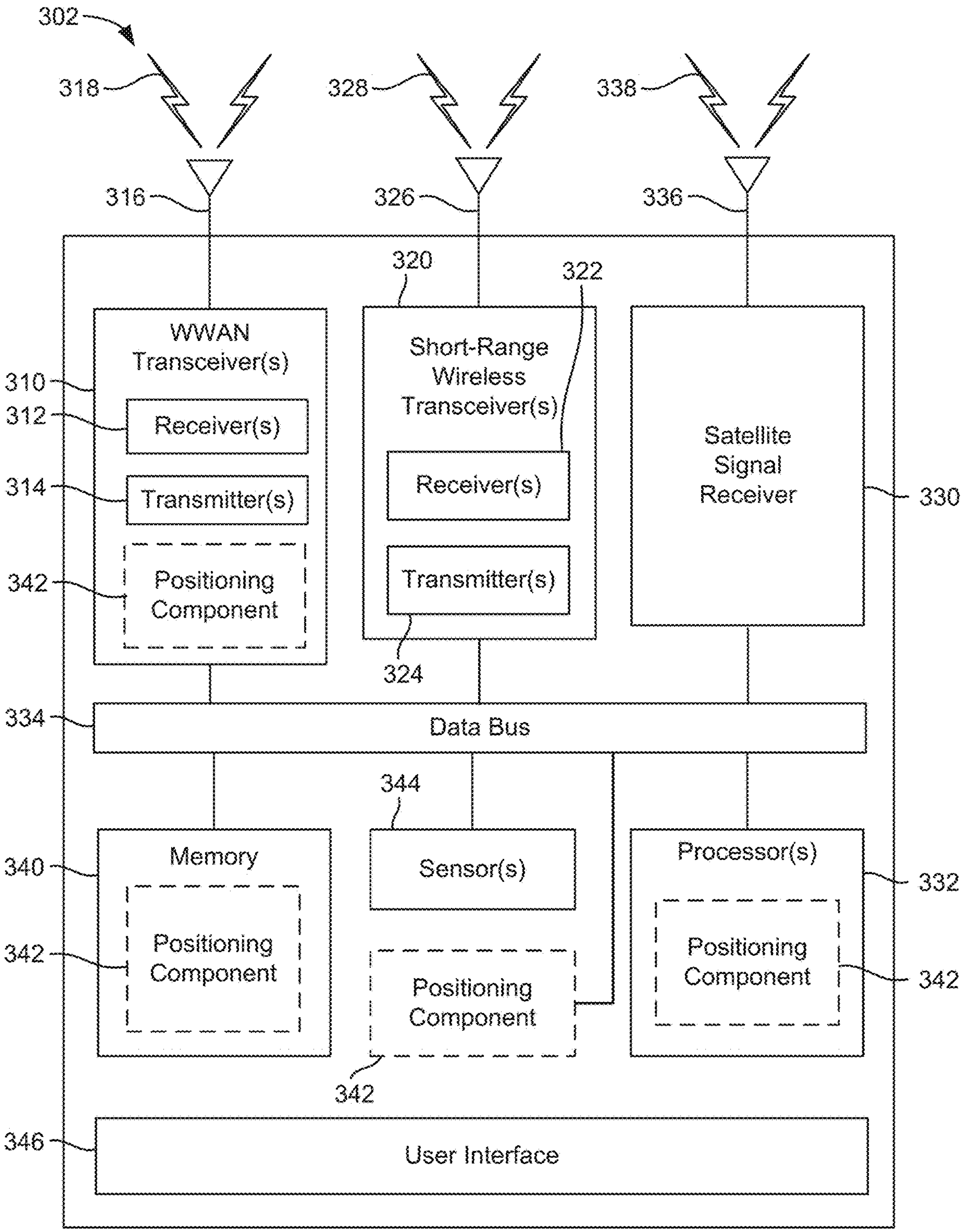
FIGS. 3A, 3B, and 3C are simplified block diagrams of several sample aspects of components that may be employed in a user equipment (UE), a base station, and a network entity, respectively, and configured to support communications as taught herein.
Figure 3B:
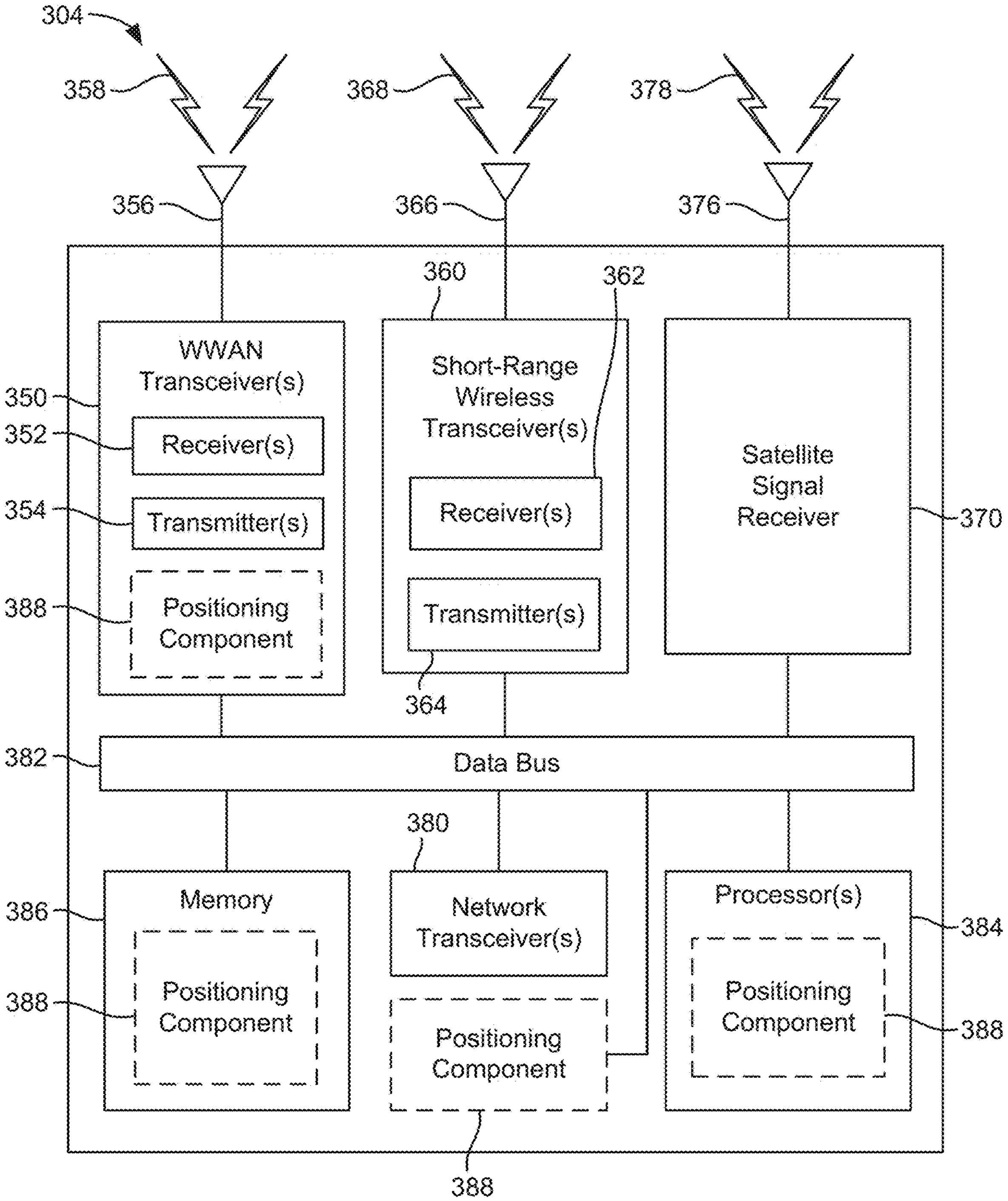
Figure 3C:
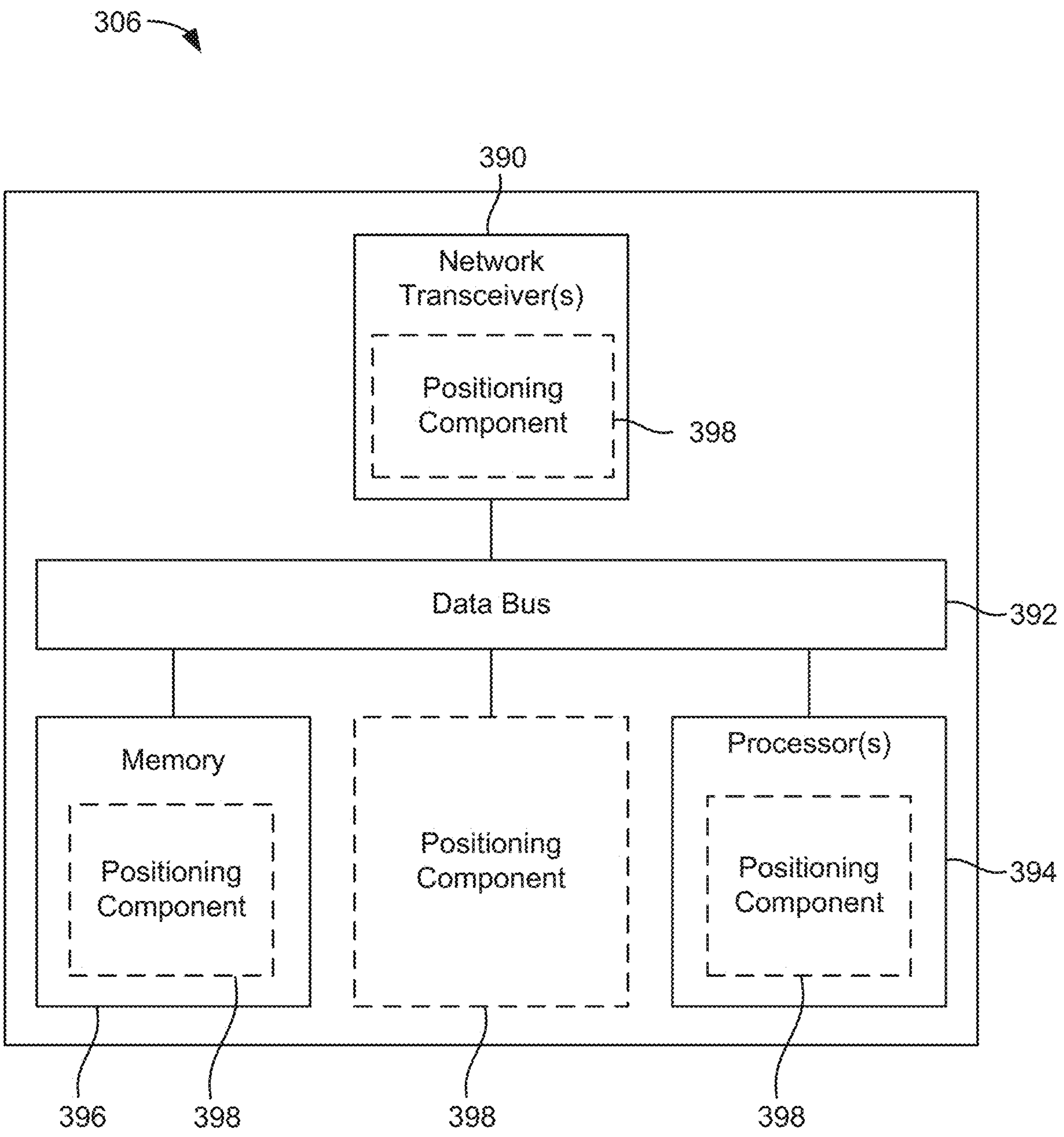

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR. LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively. and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting: PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver (s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4:
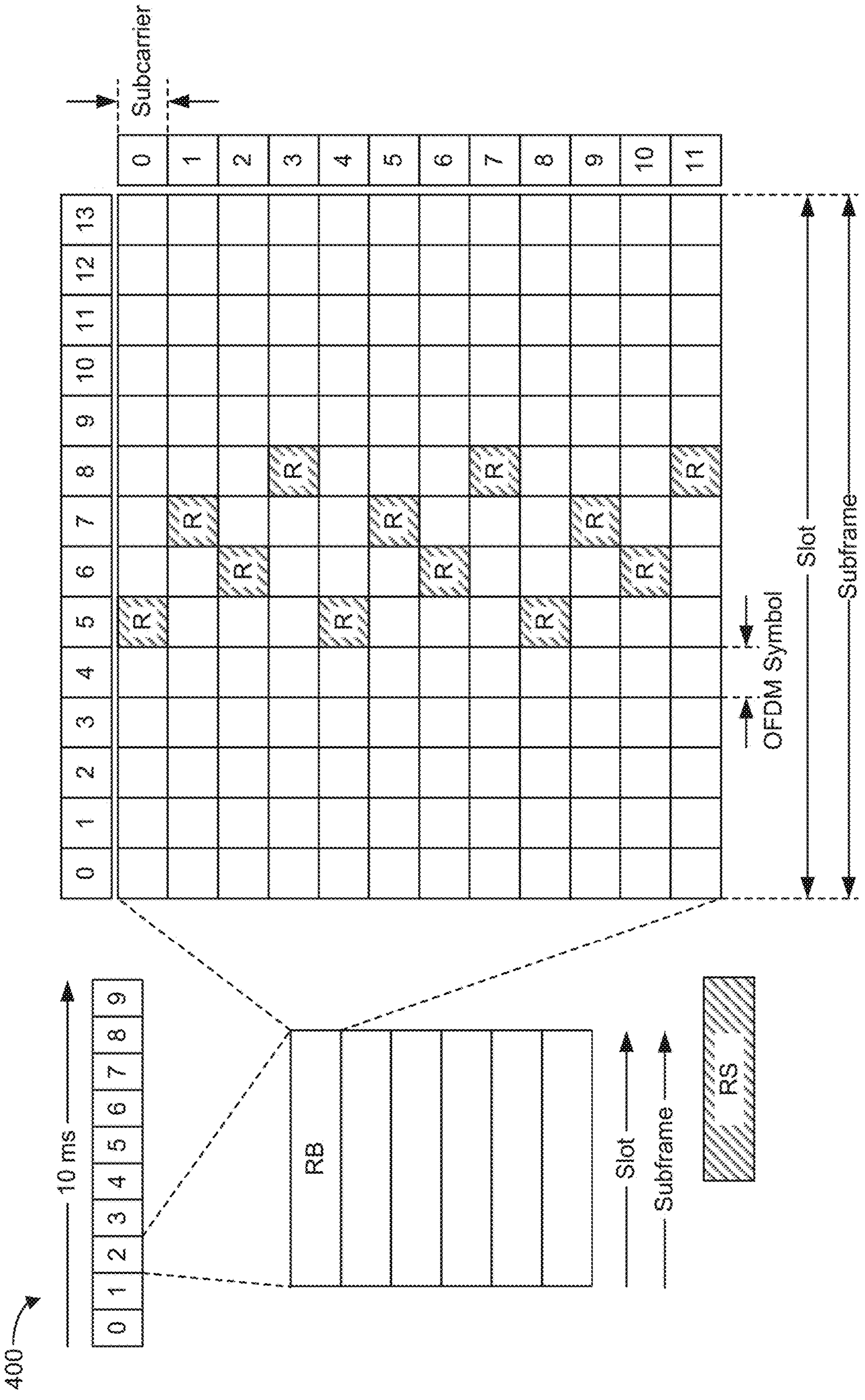
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4 illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols, 2-symbol comb-2; (0, 1); 4-symbol comb-2; (0, 1, 0, 1); 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4); 12-symbol comb-4; (0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12; (0, 6, 3, 9, 1, 7, 4, 10, 2, 8, 5, 11).

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu$*{4, 5, 8, 10, 16, 20, 32, 40, 64, 80, 160, 320, 640, 1280, 2560, 5120, 10240} slots, with $\mu$=0, 1, 2, 3. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion." a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 5:
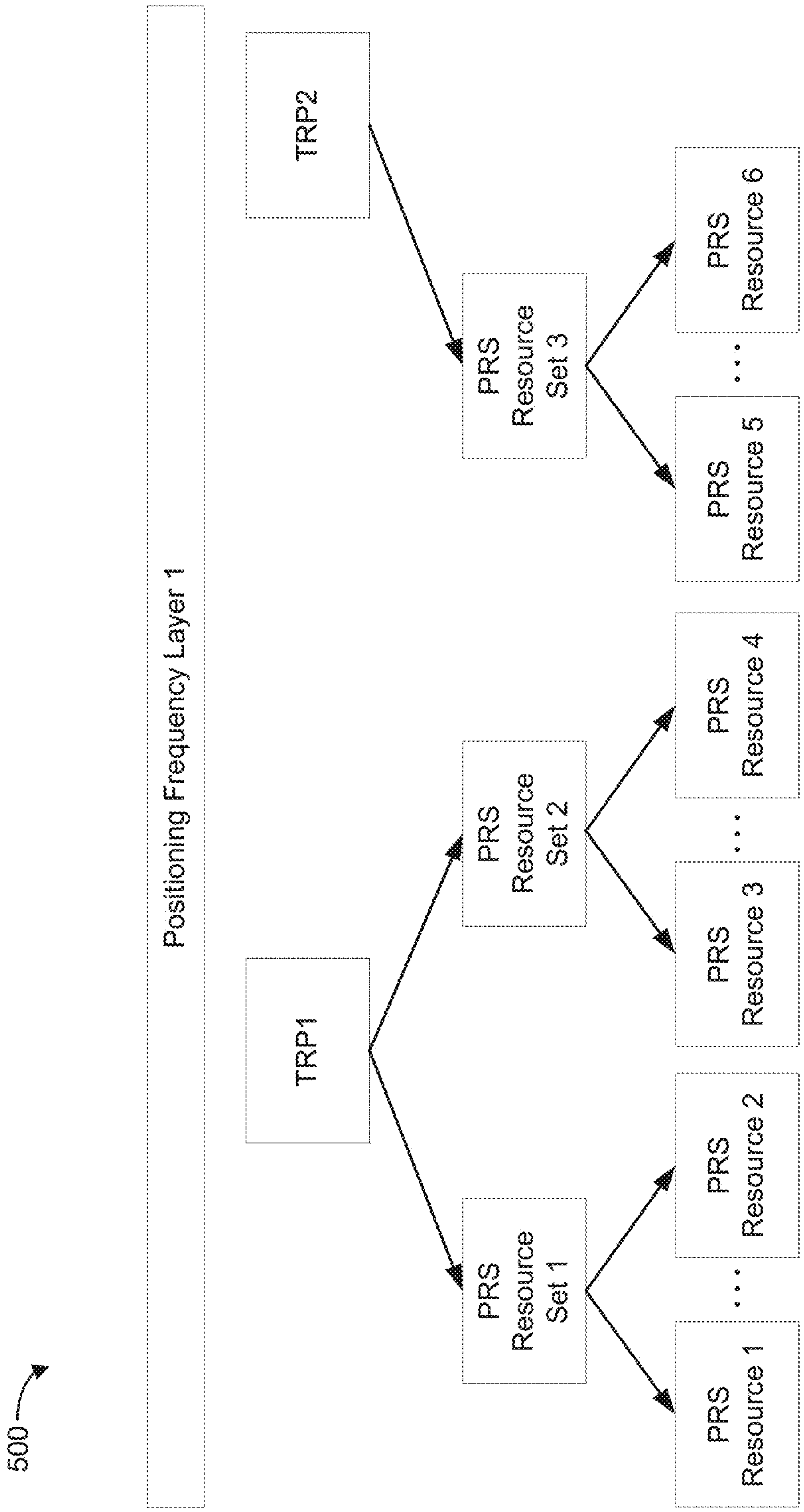
FIG. 5 is a diagram illustrating an example downlink positioning reference signal (DL-PRS) configuration for two transmission-reception points (TRPs) operating in the same positioning frequency layer, according to aspects of the disclosure.

FIG. 5 is a diagram 500 illustrating an example PRS configuration for two TRPs (labeled "TRP1" and "TRP2") operating in the same positioning frequency layer (labeled "Positioning Frequency Layer l"), according to aspects of the disclosure. For a positioning session (or positioning procedure), a UE may be provided with assistance data indicating the illustrated PRS configuration. In the example of FIG. 5, the first TRP ("TRP1") is associated with (e.g., transmits) two PRS resource sets, labeled "PRS Resource Set 1" and "PRS Resource Set 2," and the second TRP ("TRP2") is associated with one PRS resource set, labeled "PRS Resource Set 3." Each PRS resource set comprises at least two PRS rcsources. Specifically, the first PRS resource set ("PRS Resource Set 1") includes PRS resources labeled "PRS Resource 1" and "PRS Resource 2," the second PRS resource set ("PRS Resource Set 2") includes PRS resources labeled "PRS Resource 3" and "PRS Resource 4," and the third PRS resource set ("PRS Resource Set 3") includes PRS resources labeled "PRS Resource 5" and "PRS Resource 6."

Currently, a UE can be configured in the assistance data with up to four positioning frequency layers (PFLs) and up to 64 TRPs per PFL. Each TRP can have up to two PRS resource sets in a PFL, with up to 64 PRS resources per PRS resource set. This can result in a total maximum number of PRS resources in the assistance data of 32,768 (i.e., 4*64*2*64=32768). Each PRS resource may contain up to 3,264 pseudo-random QPSK pilots (2 bits) per slot per instance. These pseudo-random bits are determined based on formula in various publicly available 3GPP standards.

Figure 6A:
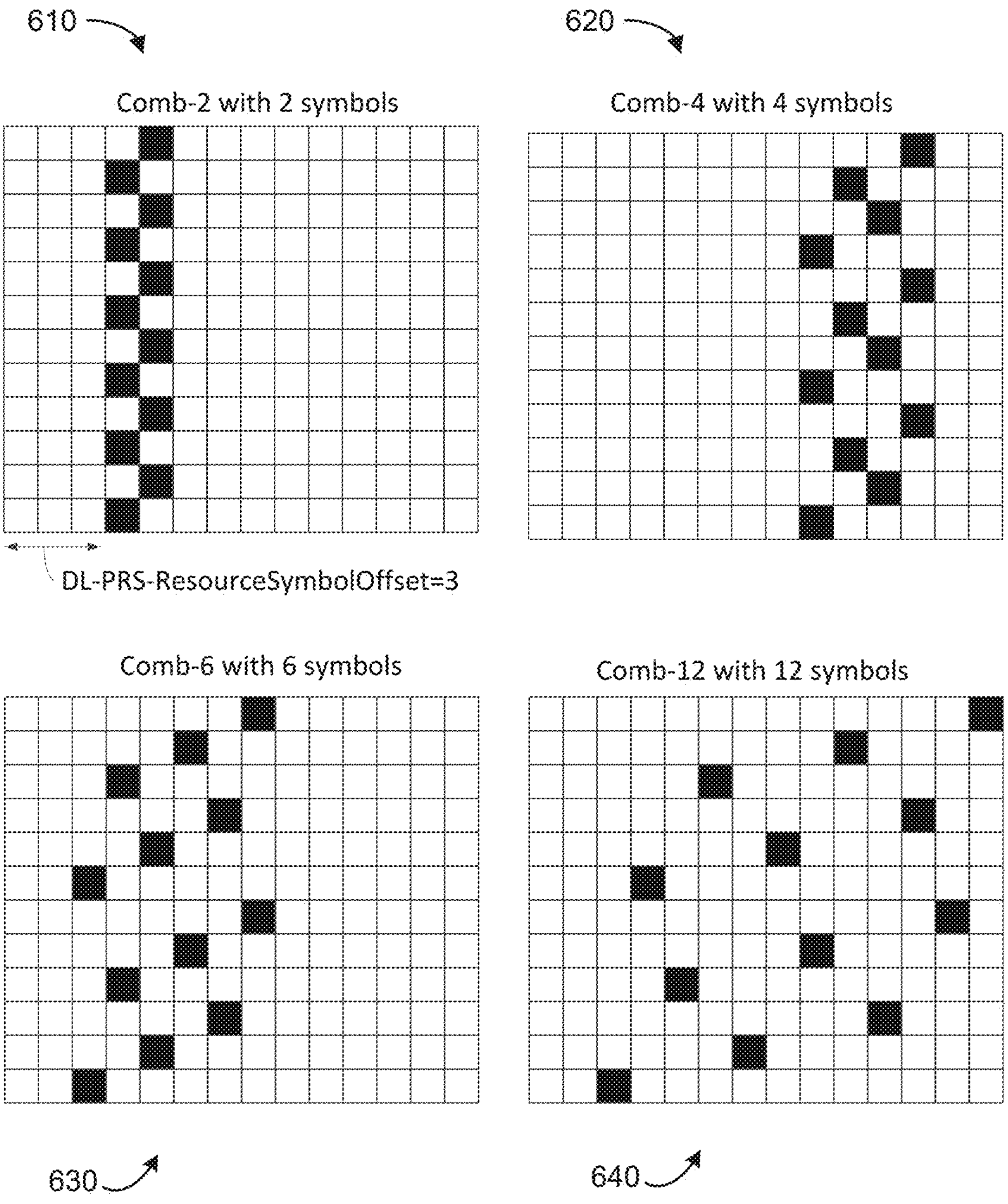
FIGS. 6A and 6B illustrate various comb patterns supported for downlink positioning reference signals (PRS) within a resource block.
Figure 6B:
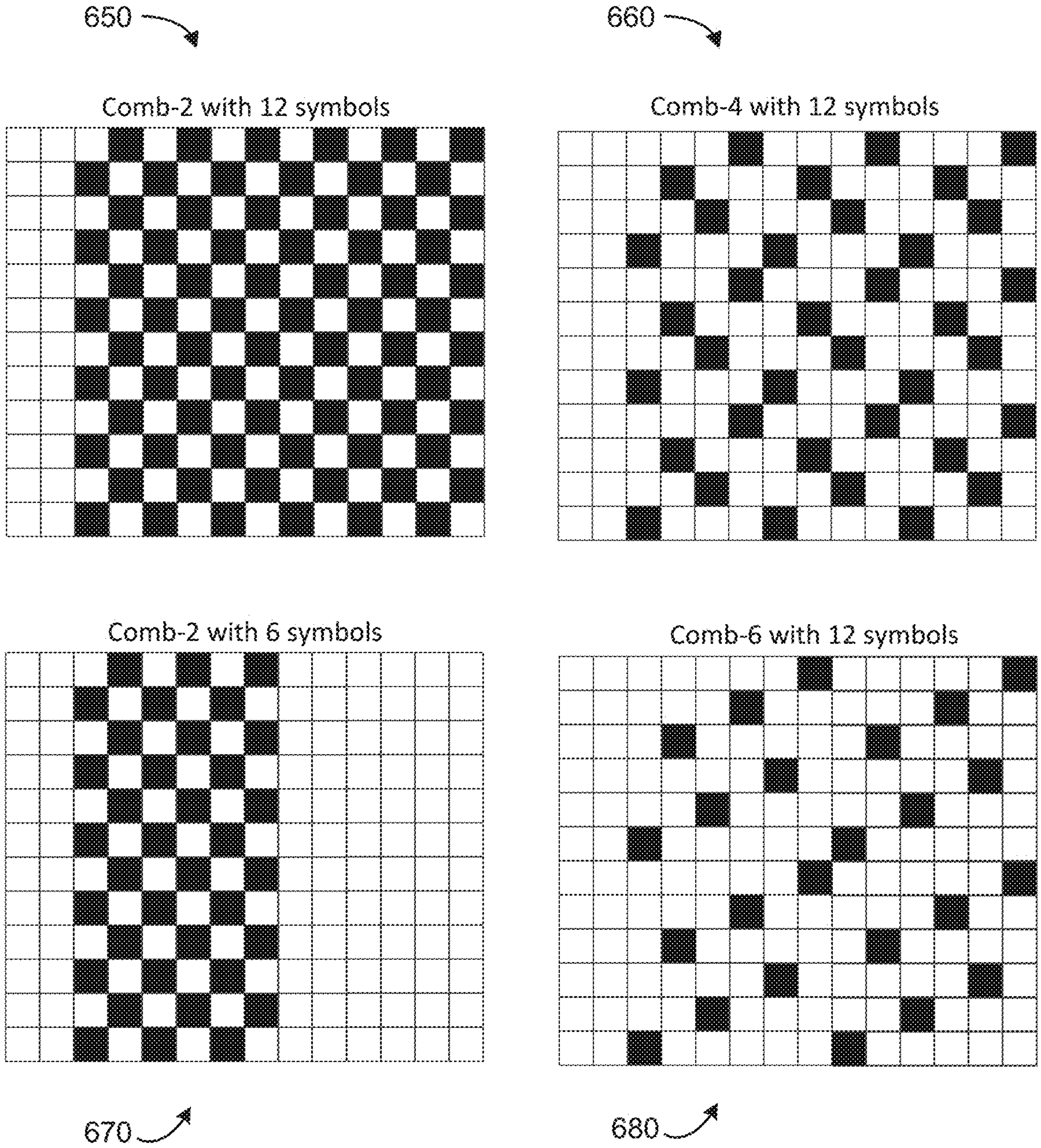

FIGS. 6A and 6B illustrate various comb patterns supported for DL-PRS within a resource block. In FIGS. 6A and 6B, time is represented horizontally and frequency is represented vertically. Each large block in FIGS. 6A and 6B represents a resource block and each small block represents a resource element. As discussed above, a resource element consists of one symbol in the time domain and one subcarrier in the frequency domain. In the example of FIGS. 6A and 6B, each resource block comprises 14 symbols in the time domain and 12 subcarriers in the frequency domain. The shaded resource elements carry, or are scheduled to carry, DL-PRS. As such, the shaded resource elements in each resource block correspond to a PRS resource, or the portion of the PRS resource within one resource block (since a PRS resource can span multiple resource blocks in the frequency domain).

The illustrated comb patterns correspond to various DL-PRS comb patterns described above. Specifically, FIG. 6A illustrates a DL-PRS comb pattern 610 for comb-2 with two symbols, a DL-PRS comb pattern 620 for comb-4 with four symbols, a DL-PRS comb pattern 630 for comb-6 with six symbols, and a DL-PRS comb pattern 640 for comb-12 with 12 symbols. FIG. 6B illustrates a DL-PRS comb pattern 650 for comb-2 with 12 symbols, a DL-PRS comb pattern 660 for comb-4 with 12 symbols, a DL-PRS comb pattern 670 for comb-2 with six symbols, and a DL-PRS comb pattern 680 for comb-6 with 12 symbols.

Note that in the example comb patterns of FIG. 6A, the resource elements on which the DL-PRS are transmitted are staggered in the frequency domain such that there is only one such resource element per subcarrier over the configured number of symbols. For example, for DL-PRS comb pattern 620, there is only one resource element per subcarrier over the four symbols. This is referred to as "frequency domain staggering."

Further, there is some DL-PRS resource symbol offset (given by the parameter "DL-PRS-ResourceSymbolOffset") from the first symbol of a resource block to the first symbol of the DL-PRS resource. In the example of DL-PRS comb pattern 610, the offset is three symbols. In the example of DL-PRS comb pattern 620, the offset is eight symbols. In the examples of DL-PRS comb patterns 630 and 640, the offset is two symbols. In the examples of DL-PRS comb pattern 650 to 680, the offset is two symbols.

As will be appreciated, a UE would need to have higher capabilities to measure the DL-PRS comb pattern 610 than to measure the DL-PRS comb pattern 620, as the UE would have to measure resource elements on twice as many subcarriers per symbol for DL-PRS comb pattern 610 as for DL-PRS comb pattern 620. In addition, a UE would need to have higher capabilities to measure the DL-PRS comb pattern 630 than to measure the DL-PRS comb pattern 640, as the UE will have to measure resource elements on twice as many subcarriers per symbol for DL-PRS comb pattern 630 as for DL-PRS comb pattern 640. Further, the UE would need to have higher capabilities to measure the DL-PRS comb patterns 610 and 620 than to measure the DL-PRS comb patterns 630 and 640, as the resource elements of DL-PRS comb patterns 610 and 620 are denser than the resource elements of DL-PRS comb patterns 630 and 640.

Currently, there is no security for the physical layer since physical layer signals need to be backwards compatible. As such, there are potential attack scenarios relevant to DL-PRS and NR Release 17 positioning. A first type of attack is where an attacker receives one or more PRS symbols, determines transmission parameters of the symbols, generates a new signal for a subsequent PRS. A second type of attack is where a disguised attacker receives the full PRS configuration through broadcasted assistance data or unicast RRC signaling. The attacker can then generate PRS as defined in the assistance data and transmits them to the receiver. A third type of attack is where an attacker observes a first part of a single OFDM symbol, detects the transmitted quadrature amplitude modulation (QAM) symbols, and generates a second part of the OFDM symbol. The present disclosure provides techniques for protecting against the third type of attack.

The following table illustrates different types of attacks related to the third type of attack and how they have been addressed in IEEE 802.11 az secure long training field (LTF) design. IEEE 802.11az, also referred to as Wi-Fi 802.11 az, looks at ways to improve the location and positioning of users on a Wi-Fi network.

TABLE 1

| Name | Description | Enhancement in Wi-Fi 802.11az |
|---|---|---|
| Cyclic Prefix Attack | The attacker listens to the cyclic prefix (CP) at the beginning of | Remove the CP (Zero Guard OFDM) |

TABLE 1-continued

| Name | Description | Enhancement in Wi-Fi 802.11az |
|---|---|---|
| | one PRS symbol and transmits a copy of the CP in a subsequent symbol | |
| Noise Attack (Jamming) | The man-in-the-middle transmits noise. Sometimes this will produce a channel estimate with an artificially carlier path | Include multiple repetitions to that the receiver can check the consistency between repetitions |
| Computational (Frequency Domain (FD)) Attack | The attacker listens to the initial part of the PRS, decodes it, and then sends an attack in the second part of the PRS | 64-QAM Modulation Advanced Encryption Standard (AES)-128 Counter Mode, stream cipher, in the physical layer for pseudo random bit generation Pre-stream phase rotation to minimize unintended beamforming |
| Sample-by-Sample (or Minimum Mean Square Error (MMSE) or Time Domain (TD)) Attack | The attacker listens to a portion of the symbol and then predicts the next few samples. Bandlimited waveform results in autocorrelation between samples | Frequency domain window: Different windows make the farther out predictions more difficult |

Figure 7A:
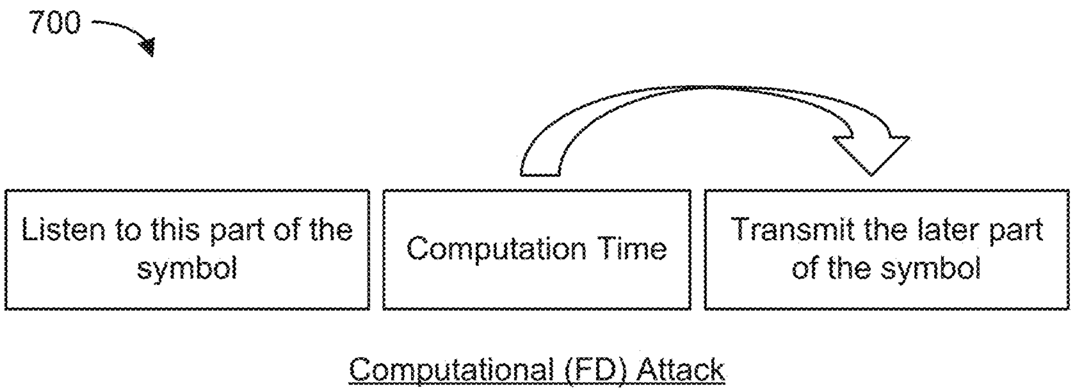
FIGS. 7A and 7B illustrate two different types of attacks in which an attacker observes the first part of a symbols and transmits during a second part of the symbol, according to aspects of the disclosure.
Figure 7B:
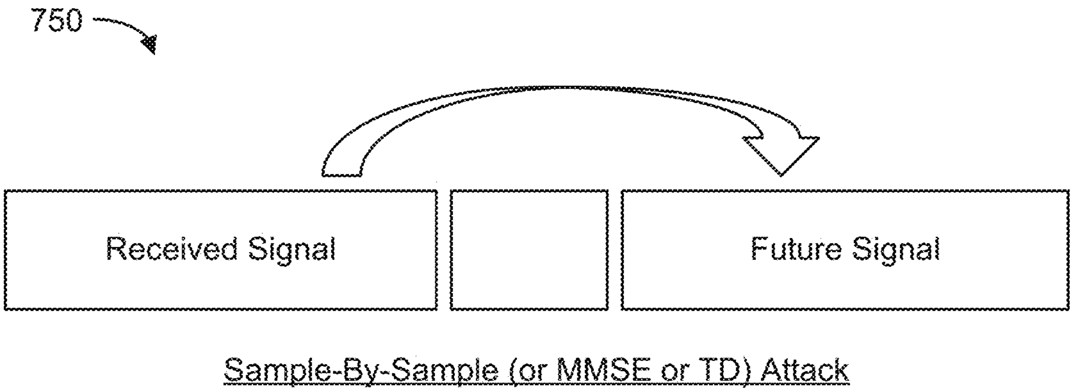

FIGS. 7A and 7B illustrate two different types of attacks in which an attacker observes the first part of a symbols and transmits during a second part of the symbol, according to aspects of the disclosure. Specifically, FIG. 7A is a diagram 700 illustrating a computational attack, also referred to as a frequency domain (FD) attack. As shown in FIG. 7A, during the first portion of a symbol, the attacker "listens" to the waveform (e.g., PRS) and decodes it (shown as "computation time"). Specifically, the attacker detects the transmitted QAM symbols. Because the attacker has decoded the waveform, it can guess what the remainder of the waveform should look like, and therefore transmits the remainder of the waveform in the final portion of the symbol.

FIG. 7B is a diagram 750 illustrating a sample-by-sample attack, also referred to as a minimum mean square error (MMSE) attack or time domain (TD) attack. As shown in FIG. 7B, during the first portion of a symbol, the attacker "listens" to the waveform (e.g., PRS) and predicts the next few samples of the waveform. The attacker then transmits those predicted samples.

Figure 8:
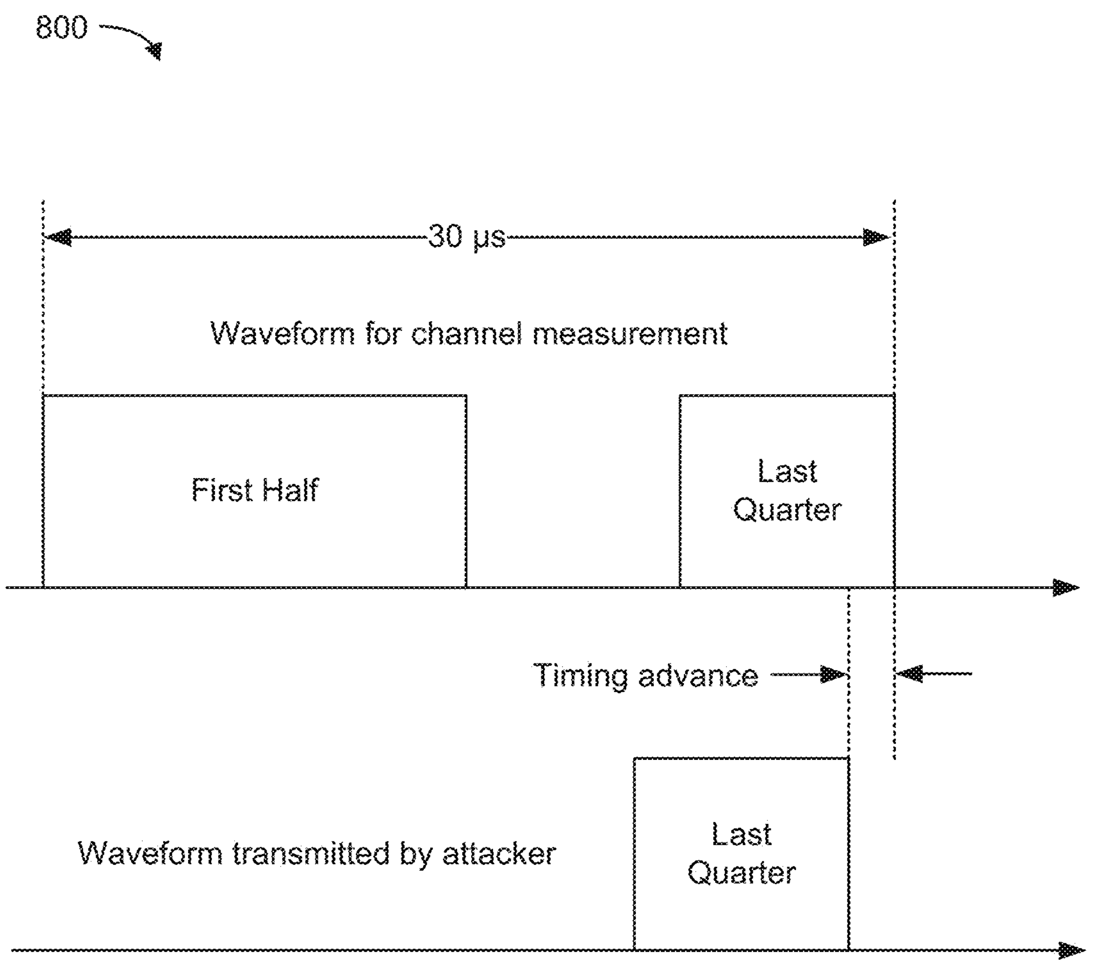
FIG. 8 illustrates an example of a frequency domain/computational attack in greater detail, according to aspects of the disclosure.

FIG. 8 is a diagram 800 illustrating an example of a frequency domain/computational attack in greater detail, according to aspects of the disclosure. In the example of FIG. 8, a 30 μs symbol length is shown. During the first half of the symbol, the attacker will "listen" to the PRS waveform. The attacker will then try to estimate the full time-domain PRS symbol (typically by estimating frequency-domain QAM symbols). The attacker can then attempt to change the receiver's measurement of the PRS by transmitting the last (estimated) quarter of the time-domain LTF waveform with some timing advance.

The disadvantages of such an attack include that attack correlation is limited by attack duration. In addition, the receiver will notice poor SINR or RSRP variation across symbols. As shown in Table I above, certain counters have been proposed in Wi-Fi. For example, the transmitter and receiver can move to a higher order PSK constellation, e.g., 64 QAM. As another example, the transmitter can use a "poor" constellation to increase decoding errors. As yet another option, the transmitter can remove structure in the frequency domain, e.g., random Gaussian modulation or discrete Fourier transform (DFT) precoded modulation.

Note that partial observation of an OFDM symbol leads to inter-carrier interference (ICI). An attacker that attempts to decode using frequency-domain processing (e.g., QAM-symbol demodulation) will be limited by the ICI.

Figure 9:
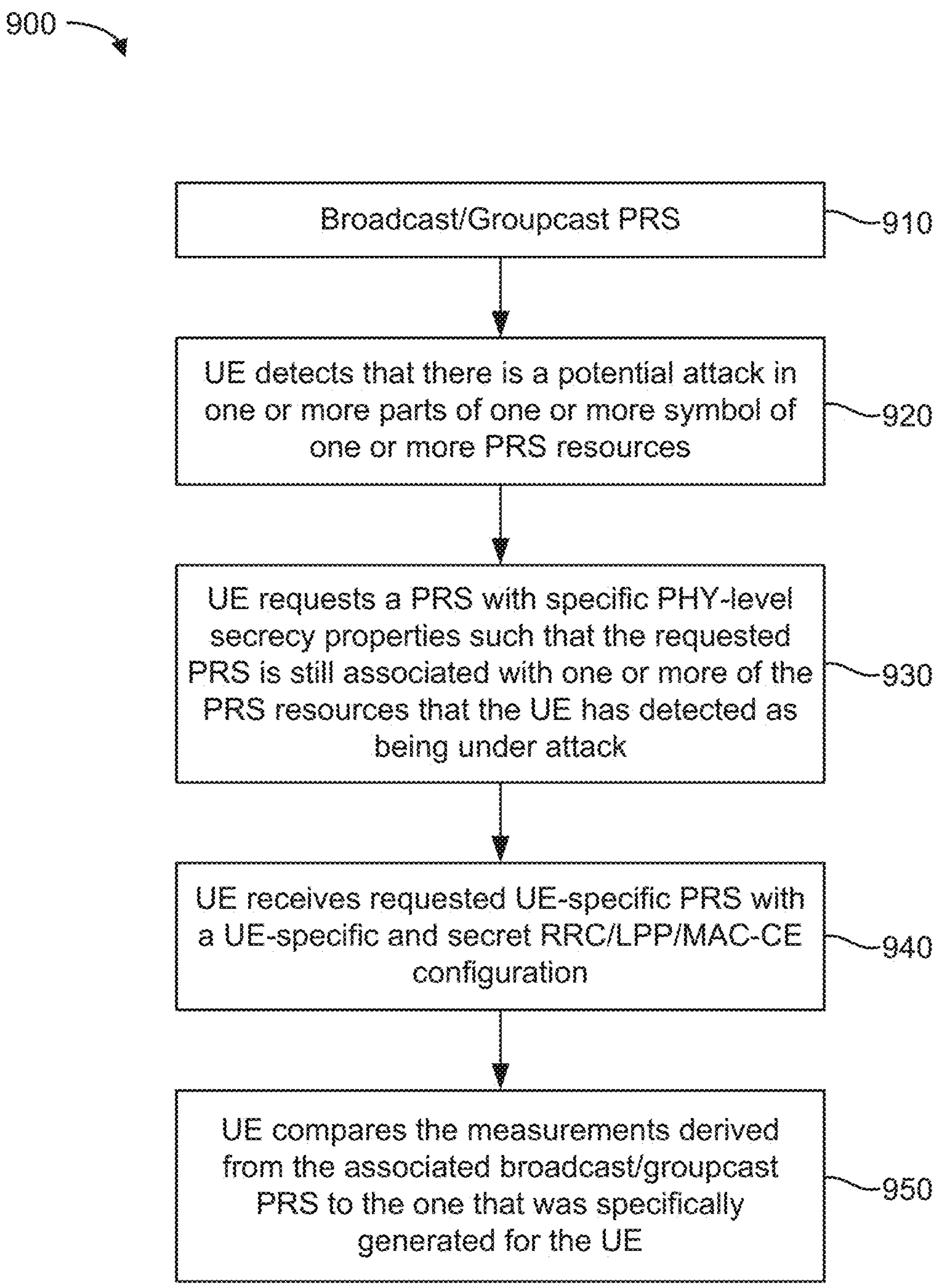
FIG. 9 illustrates an example method for using on-demand PRS for detecting security attacks, according to aspects of the disclosure.

The present disclosure provides techniques for using the on-demand PRS framework for detecting security attacks. The broad method is illustrated in FIG. 9. Specifically, FIG. 9 illustrates an example method 900 for using on-demand PRS for detecting security attacks, according to aspects of the disclosure.

At stage 910, broadcast or groupeast PRS are transmitted. For example, the PRS may be broadcasted or groupcasted by a any of the base stations described herein.

At stage 920, a UE detects that there is a potential attack in one or more parts of one or more symbol of one or more PRS resources of the broadcasted or groupcasted PRS. For example, the UE may notice that a measurement of a PRS resource is inconsistent with the expected measurement, or that the time of arrival associated with the first half of a symbol is different than the time of arrival associated with the second half of a symbol.

At stage 930, the UE requests transmission of PRS (i.e., UE initiated on-demand PRS), or the network (e.g., LMF 270) requests transmission of PRS (i.e., network-initiated on-demand PRS), with a specific PHY-level secrecy (or security) properties. The secrecy properties should be such that the requested PRS is still associated (e.g., QCL or same port association) with the one or more of the PRS resources that the UE has detected as being under attack. The PHY-level secrecy properties may correspond to one or more of the aspects described below.

At stage 940, the base station configures (and transmits) such a UE-specific PRS with a UE-specific and secret LPP, RRC, or MAC control element (MAC-CE) configuration. For example, the sequence may be UE-specific, and the waveform follows the required secrecy properties that were requested. For sidelink, the involved UEs may use the PC5 protocol to communicate the UE-specific PRS configuration(s).

At stage 950, the UE compares the measurement(s) derived from the associated broadcast/groupcast PRS to measurement(s) derived from the PRS that was specifically generated for the UE. If the measurements are sufficiently different (e.g., above some threshold), then the UE can assume that there is or was an attacker present.

There are various secrecy properties that can help to combat against a frequency domain, or computational, attack. As a first option, the UE can request, and the base station can transmit, PRS with comb-1 density to avoid repetition of the waveform across time. Alternatively, the base station can transmit PRS with a comb-N density (where N is greater than 1) with frequency-division multiplexed QAM symbols in the unused resource elements of the comb pattern. For example, for the DL-PRS comb pattern 610 in FIG. 6A, the "white" resource elements in the third and fourth symbols could be filled with random noise so that they do not appear to an attacker to be empty.

As a second option, the UE can request, and the base station can transmit with, a CP-OFDM waveform with an M-PSK modulation. The value of M may be chosen or recommended by the UE or the network (e.g., LMF 270). In various aspects, the 3GPP standards may support a predefined set of M-PSK, such as 8-PSK, 16-PSK, 32-PSK, and 64-PSK. In addition, different values of M may be used, with a phase shift, for different PRS resources, different PRS resource sets, different PFLs, different frequency bands, and/or different frequency ranges.

Note that PSK is a modulation process that conveys data by changing (modulating) the phase of a constant frequency reference signal (the carrier wave). PSK uses a finite number of phases (e.g., 2, 4, 8), each assigned a unique pattern of binary digits. Usually, each phase encodes an equal number of bits. Each pattern of bits forms the symbol that is represented by the particular phase. Thus, for example, the four phases of a QPSK represent the binary digit patterns "00," "01," "10," and "11," and these patterns represent four different symbols. The demodulator, which is designed specifically for the symbol-set used by the modulator, determines the phase of the received signal and maps it back to the symbol it represents, thus recovering the original data. A plurality of symbols at the physical layer (also referred to as the "link layer") convey a data packet, with header and payload, at higher layers.

As a third option, the UE can request PRS, and the base station can transmit PRS, where each PSK/QAM symbol is modulated based on a secret key and an available set of potential phase shifts. This phase shift could be a ramp in the frequency domain, or a set of random phases each generated from the secret key, or the secret key could be used as a seed to generate a set of phases. The UE should be provided with the secret key so that it can decode the new PSK format.

Figure 10:
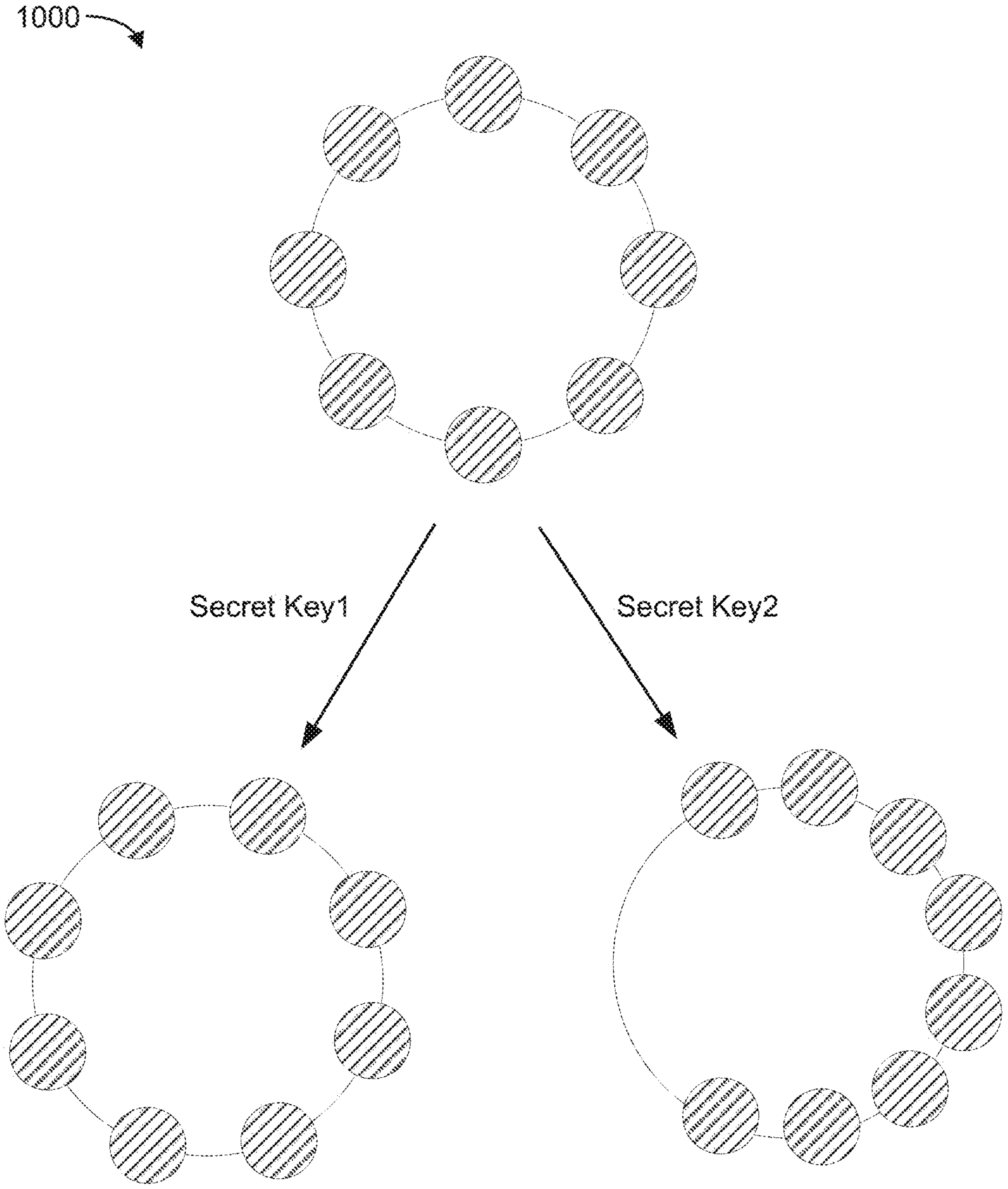
FIG. 10 is a diagram illustrating how a secret key may change the current M-size phase-shift keying (M-PSK) constellation, according to aspects of the disclosure.

FIG. 10 is a diagram 1000 illustrating how a secret key may change the current M-PSK constellation, according to aspects of the disclosure. A PSK modulation is illustrated by a phase-shift diagram, or constellation, indicating the possible phases of an electromagnetic wave. In the example of FIG. 10, the PSK is 8-PSK, so there are eight possible phases in the constellation, represented by eight cross-hatched circles. As shown in FIG. 10, a first secret key, labeled "Secret Key 1," simply rotates the M-PSK constellation. In contrast, a second secret key, labeled "Secret Key 2." shifts the actual locations of the possible phases.

With further reference to the third option described above, the UE (or location server) may recommend the size of the pool of random phases. For example, there may be X values selected from the set $\{0, \pi/N, 2*\pi/N, \ldots .2*\pi-(N-1)*\pi N\}$. The applicable 3GPP standard may include a table of combinations of K sets, each one corresponding to one or more sets with X elements each. The UE (or location server) may request/recommend one of those to be used at each OFDM symbol, each PRS resource, each PRS resource set, each PFL, each TRP, each frequency band, and/or each frequency range. Note that the higher the value of X, the more difficult it is for a frequency-domain attacker to determine the transmitted PSK symbol in each resource element.

In various aspects, there may be an association between a QoS security level (configured/chosen/requested by the location server for a positioning session, or the external client, or the UE) and a specific security level/solution from the ones shown above (e.g., one or a combination of the three options described above).

Figure 11:
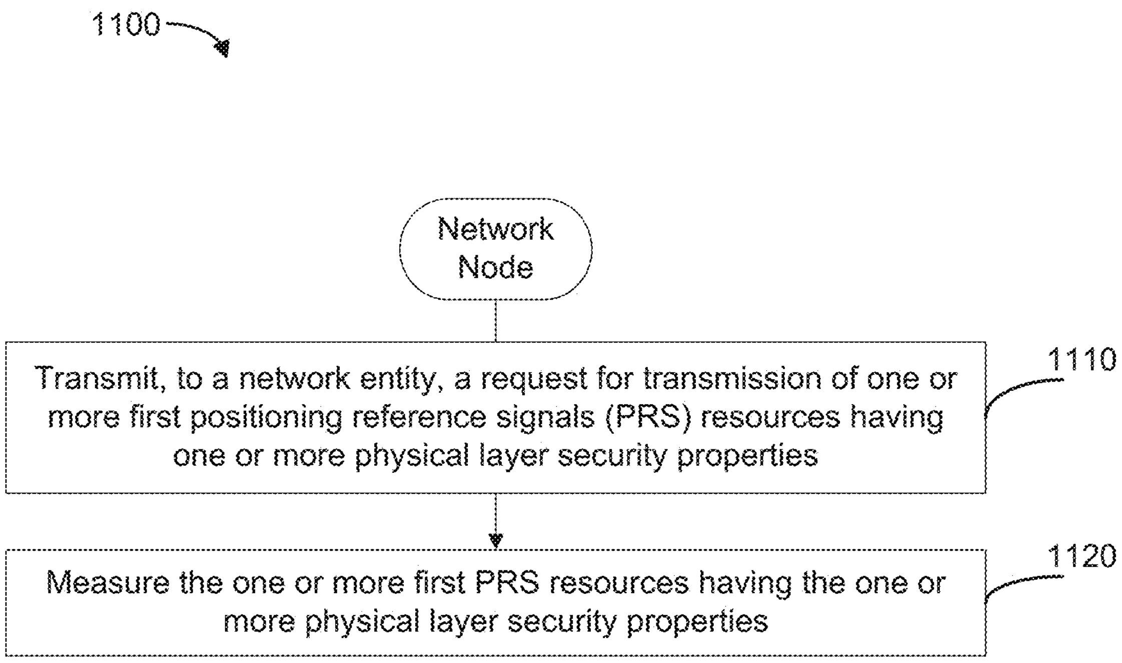
FIGS. 11 and 12 illustrate example methods of communication, according to aspects of the disclosure.

In various aspects, the foregoing techniques may be applied to sidelink and/or uplink PRS transmission as well. For sidelink, the communication would be between two UEs (a transmitter and a receiver) over the PC5 interface, and for uplink, the location server (as the receiver of the measurement report from the UE) would detect a possible SRS attack and ask the base station to configure the UE with SRS having physical layer security properties. The physical layer security properties may be the same for the SRS as they would be for PRS (e.g., one or a combination of the FIG. 11 illustrates an example method 1100 of wireless positioning, according to aspects of the disclosure. In an aspect, method 1100 may be performed by a network node (e.g., any of the UEs or base stations described herein).

At 1110, the network node transmits, to a network entity (e.g., LMF 270), a request for transmission of one or more first PRS resources having one or more physical layer security properties. In an aspect, where the network node is a UE, operation 1110 may be performed by the one or more WWAN transceivers 310, the one or more processors 332, memory 340, and/or positioning component 342, any or all of which may be considered means for performing this operation. In an aspect, where the network node is a base station, operation 1110 may be performed by the one or more WWAN transceivers 350, the one or more network transceivers 380, the one or more processors 384, memory 386, and/or positioning component 388, any or all of which may be considered means for performing this operation.

At 1120, the network node measures the one or more first PRS resources having the one or more physical layer security properties. In an aspect, where the network node is a UE, operation 1120 may be performed by the one or more WWAN transceivers 310, the one or more processors 332, memory 340, and/or positioning component 342, any or all of which may be considered means for performing this operation. In an aspect, where the network node is a base station, operation 1120 may be performed by the one or more WWAN transceivers 350, the one or more network transceivers 380, the one or more processors 384, memory 386, and/or positioning component 388, any or all of which may be considered means for performing this operation.

Figure 12:
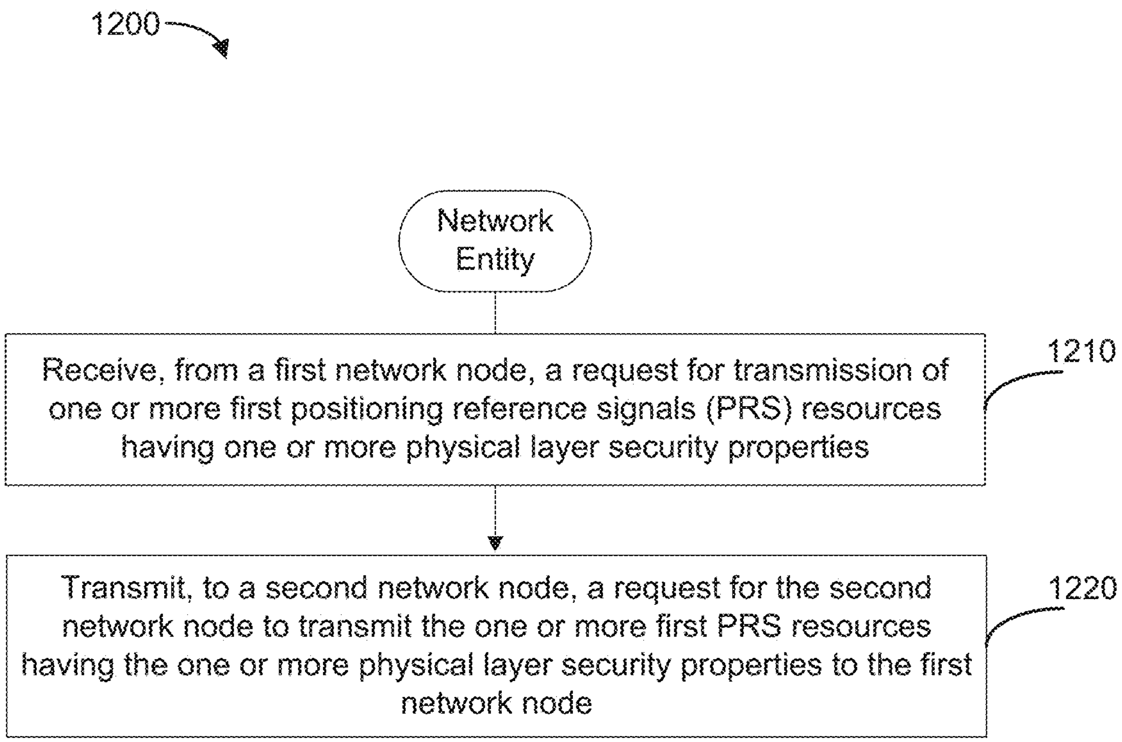

FIG. 12 illustrates an example method 1200 of communication, according to aspects of the disclosure. In an aspect, method 1200 may be performed by a network entity (e.g., a base station or a location server).

At 1210, the network entity receives, from a first network node (e.g., a UE or a base station), a request for transmission of one or more first PRS resources having one or more physical layer security properties. In an aspect, where the network entity is a base station, operation 1210 may be performed by the one or more WWAN transceivers 350, the one or more network transceivers 380, the one or more processors 384, memory 386, and/or positioning component 388, any or all of which may be considered means for performing this operation. In an aspect, where the network entity is a location server, operation 1210 may be performed by the one or more network transceivers 390, the one or more processors 394, memory 396, and/or positioning component 398, any or all of which may be considered means for performing this operation.

At 1220, the network entity transmits, to a second network node (e.g., another UE or base station), a request for the second network node to transmit the one or more first PRS resources having the one or more physical layer security properties to the first network node. In an aspect, where the network entity is a base station, operation 1220 may be performed by the one or more WWAN transceivers 350, the one or more network transceivers 380, the one or more processors 384, memory 386, and/or positioning component 388, any or all of which may be considered means for performing this operation. In an aspect, where the network entity is a location server, operation 1220 may be performed by the one or more network transceivers 390, the one or more processors 394, memory 396, and/or positioning component 398, any or all of which may be considered means for performing this operation.

As will be appreciated, a technical advantage of the methods 1100 and 1200 is increased security for PRS transmission.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless positioning performed by a network node, comprising: transmitting, to a network entity, a request for transmission of one or more first positioning reference signals (PRS) resources having one or more physical layer security properties; and measuring the one or more first PRS resources having the one or more physical layer security properties.

Clause 2. The method of clause 1, further comprising: measuring one or more second PRS resources; and detecting a potential attack in one or more parts of one or more symbol of the one or more second PRS resources, wherein the request for transmission of the one or more first PRS is transmitted in response to detecting the potential attack.

Clause 3. The method of clause 2, wherein the one or more first PRS resources have a quasi-colocation (QCL) relation with the one or more second PRS resources, the one or more first PRS resources are associated with a same antenna port as the one or more second PRS resources, or both.

Clause 4. The method of any of clauses 2 to 3, further comprising: comparing measurements of the one or more first PRS resources to measurements of the one or more second PRS resources; and determining, based on the measurements of the one or more first PRS resources being greater than a threshold different than the measurements of the one or more second PRS resources, that the one or more second PRS resources were subject to an attack.

Clause 5. The method of any of clauses 1 to 4, further comprising: receiving a configuration of the one or more first PRS resources having the one or more physical layer security properties, the configuration including at least values for the one or more physical layer security properties.

Clause 6. The method of clause 5, wherein the configuration is received from a base station via one or more radio resource control (RRC) messages, one or more medium access control control elements (MAC-CEs), or any combination thereof.

Clause 7. The method of clause 5, wherein the configuration is received from a location server via one or more Long-Term Evolution (LTE) positioning protocol (LPP) messages.

Clause 8. The method of any of clauses 1 to 7, wherein the request for transmission of the one or more first PRS resources includes proposed values for the one or more physical layer security properties.

Clause 9. The method of any of clauses 1 to 8, wherein the one or more first PRS resources having the one or more physical layer security properties comprises: the one or more first PRS resources having a comb-1 comb pattern, or the one or more first PRS resources having a comb-N comb pattern with quadrature amplitude modulation (QAM) symbols frequency-division multiplexed in unused resource elements (REs) of the comb-N comb pattern.

Clause 10. The method of any of clauses 1 to 9, wherein the one or more first PRS resources having the one or more physical layer security properties comprises: the one or more first PRS resources being transmitted as a cyclic prefix orthogonal frequency division multiplexing (CP-OFDM) waveform having an M-sized phase-shift keying (PSK) modulation scheme, where M is greater than or equal to 8.

Clause 11. The method of clause 10, wherein different values of M are used for different PRS resources, different PRS resource sets, different positioning frequency layers, different frequency bands, different frequency ranges, or any combination thereof.

Clause 12. The method of any of clauses 1 to 11, wherein the one or more first PRS resources having the one or more physical layer security properties comprises: the one or more first PRS resources having a phase shift determined by a secret key.

Clause 13. The method of clause 12, wherein the phase shift comprises: a ramp in a frequency domain, one of a set of random phases each generated from the secret key, or one of a set of phases each generated from the secret key.

Clause 14. The method of clause 13, wherein a size of the set of random phases or a size of the set of phases is recommended by the network node or a location server.

Clause 15. The method of any of clauses 1 to 14, wherein a type of the one or more physical layer security properties is based on a quality of service (QoS) level for a positioning session between the network node and the network entity during which the network node measures the one or more first PRS resources.

Clause 16. The method of any of clauses 1 to 15, wherein: the network node is a user equipment (UE), the network entity is a location server, and the one or more first PRS resources are one or more downlink PRS resources.

Clause 17. The method of any of clauses 1 to 15, wherein: the network node is a first UE, the network entity is a second UE, and the one or more first PRS resources are one or more sidelink PRS resources.

Clause 18. The method of any of clauses 1 to 15, wherein: the network node is a base station, the network entity is a location server, and the one or more first PRS resources are one or more uplink PRS resources.

Clause 19. A method of communication performed by a network entity, comprising: receiving, from a first network node, a request for transmission of one or more first positioning reference signals (PRS) resources having one or more physical layer security properties; and transmitting, to a second network node, a request for the second network node to transmit the one or more first PRS resources having the one or more physical layer security properties to the first network node.

Clause 20. The method of clause 19, wherein: the first network node is a user equipment (UE), the second network node is a base station serving the UE, the network entity is a location server, and the one or more first PRS resources are one or more downlink PRS resources.

Clause 21. The method of clause 19, wherein: the first network node is a first UE, the second network node is a second UE, the network entity is a base station serving one or both of the first UE and the second UE, and the one or more first PRS resources are one or more sidelink PRS resources.

Clause 22. The method of clause 19, wherein: the first network node is a neighboring base station of the UE, the second network node is a UE, the network entity is a serving base station of the UE, and the one or more first PRS resources are one or more uplink PRS resources.

Clause 23. A network node, comprising: a memory; at least one transceiver; and at least one processor communicatively coupled to the memory and the at least one transceiver, the at least one processor configured to: transmit, via the at least one transceiver, to a network entity, a request for transmission of one or more first positioning reference signals (PRS) resources having one or more physical layer security properties; and measure the one or more first PRS resources having the one or more physical layer security properties.

Clause 24. The network node of clause 23, wherein the at least one processor is further configured to: measure one or more second PRS resources; and detect a potential attack in one or more parts of one or more symbol of the one or more second PRS resources, wherein the request for transmission of the one or more first PRS is transmitted in response to detecting the potential attack.

Clause 25. The network node of clause 24, wherein the one or more first PRS resources have a quasi-colocation (QCL) relation with the one or more second PRS resources, the one or more first PRS resources are associated with a same antenna port as the one or more second PRS resources, or both Clause 26. The network node of any of clauses 24 to 25, wherein the at least one processor is further configured to: compare measurements of the one or more first PRS resources to measurements of the one or more second PRS resources; and determine, based on the measurements of the one or more first PRS resources being greater than a threshold different than the measurements of the one or more second PRS resources, that the one or more second PRS resources were subject to an attack.

Clause 27. The network node of any of clauses 23 to 26, wherein the at least one processor is further configured to: receive, via the at least one transceiver, a configuration of the one or more first PRS resources having the one or more physical layer security properties, the configuration including at least values for the one or more physical layer security properties.

Clause 28. The network node of clause 27, wherein the configuration is received from a base station via one or more radio resource control (RRC) messages, one or more medium access control control elements (MAC-CEs), or any combination thereof.

Clause 29. The network node of clause 27, wherein the configuration is received from a location server via one or more Long-Term Evolution (LTE) positioning protocol (LPP) messages.

Clause 30. The network node of any of clauses 23 to 29, wherein the request for transmission of the one or more first PRS resources includes proposed values for the one or more physical layer security properties.

Clause 31. The network node of any of clauses 23 to 30, wherein the one or more first PRS resources having the one or more physical layer security properties comprises: the one or more first PRS resources having a comb-1 comb pattern, or the one or more first PRS resources having a comb-N comb pattern with quadrature amplitude modulation (QAM) symbols frequency-division multiplexed in unused resource elements (REs) of the comb-N comb pattern.

Clause 32. The network node of any of clauses 23 to 31, wherein the one or more first PRS resources having the one or more physical layer security properties comprises: the one or more first PRS resources being transmitted as a cyclic prefix orthogonal frequency division multiplexing (CP-OFDM) waveform having an M-sized phase-shift keying (PSK) modulation scheme, where M is greater than or equal to 8.

Clause 33. The network node of clause 32, wherein different values of M are used for different PRS resources, different PRS resource sets, different positioning frequency layers, different frequency bands, different frequency ranges, or any combination thereof.

Clause 34. The network node of any of clauses 23 to 33, wherein the one or more first PRS resources having the one or more physical layer security properties comprises: the one or more first PRS resources having a phase shift determined by a secret key.

Clause 35. The network node of clause 34, wherein the phase shift comprises: a ramp in a frequency domain, one of a set of random phases each generated from the secret key, or one of a set of phases each generated from the secret key.

Clause 36. The network node of clause 35, wherein a size of the set of random phases or a size of the set of phases is recommended by the network node or a location server.

Clause 37. The network node of any of clauses 23 to 36, wherein a type of the one or more physical layer security properties is based on a quality of service (QoS) level for a positioning session between the network node and the network entity during which the network node measures the one or more first PRS resources.

Clause 38. The network node of any of clauses 23 to 37, wherein: the network node is a user equipment (UE), the network entity is a location server, and the one or more first PRS resources are one or more downlink PRS resources.

Clause 39. The network node of any of clauses 23 to 37, wherein: the network node is a first UE, the network entity is a second UE, and the one or more first PRS resources are one or more sidelink PRS resources.

Clause 40. The network node of any of clauses 23 to 37, wherein: the network node is a base station, the network entity is a location server, and the one or more first PRS resources are one or more uplink PRS resources.

Clause 41. A network entity, comprising: a memory: at least one transceiver; and at least one processor communicatively coupled to the memory and the at least one transceiver, the at least one processor configured to: receive, via the at least one transceiver, from a first network node, a request for transmission of one or more first positioning reference signals (PRS) resources having one or more physical layer security properties; and transmit, via the at least one transceiver, to a second network node, a request for the second network node to transmit the one or more first PRS resources having the one or more physical layer security properties to the first network node.

Clause 42. The network entity of clause 41, wherein: the first network node is a user equipment (UE), the second network node is a base station serving the UE, the network entity is a location server, and the one or more first PRS resources are one or more downlink PRS resources.

Clause 43. The network entity of clause 41, wherein: the first network node is a first UE, the second network node is a second UE, the network entity is a base station serving one or both of the first UE and the second UE, and the one or more first PRS resources are one or more sidelink PRS resources.

Clause 44. The network entity of clause 41, wherein: the first network node is a neighboring base station of the UE, the second network node is a UE, the network entity is a serving base station of the UE, and the one or more first PRS resources are one or more uplink PRS resources.

Clause 45. A network node, comprising: means for transmitting, to a network entity, a request for transmission of one or more first positioning reference signals (PRS) resources having one or more physical layer security properties; and means for measuring the one or more first PRS resources having the one or more physical layer security properties.

Clause 46. The network node of clause 45, further comprising: means for measuring one or more second PRS resources; and means for detecting a potential attack in one or more parts of one or more symbol of the one or more second PRS resources, wherein the request for transmission of the one or more first PRS is transmitted in response to detecting the potential attack.

Clause 47. The network node of clause 46, wherein the one or more first PRS resources have a quasi-colocation (QCL) relation with the one or more second PRS resources, the one or more first PRS resources are associated with a same antenna port as the one or more second PRS resources, or both.

Clause 48. The network node of any of clauses 46 to 47, further comprising: means for comparing measurements of the one or more first PRS resources to measurements of the one or more second PRS resources; and means for determining, based on the measurements of the one or more first PRS resources being greater than a threshold different than the measurements of the one or more second PRS resources, that the one or more second PRS resources were subject to an attack.

Clause 49. The network node of any of clauses 45 to 48, further comprising: means for receiving a configuration of the one or more first PRS resources having the one or more physical layer security properties, the configuration including at least values for the one or more physical layer security properties.

Clause 50. The network node of clause 49, wherein the configuration is received from a base station via one or more radio resource control (RRC) messages, one or more medium access control control elements (MAC-CEs), or any combination thereof.

Clause 51. The network node of clause 49, wherein the configuration is received from a location server via one or more Long-Term Evolution (LTE) positioning protocol (LPP) messages.

Clause 52. The network node of any of clauses 45 to 51, wherein the request for transmission of the one or more first PRS resources includes proposed values for the one or more physical layer security properties.

Clause 53. The network node of any of clauses 45 to 52, wherein the one or more first PRS resources having the one or more physical layer security properties comprises: the one or more first PRS resources having a comb-1 comb pattern, or the one or more first PRS resources having a comb-N comb pattern with quadrature amplitude modulation (QAM) symbols frequency-division multiplexed in unused resource elements (REs) of the comb-N comb pattern.

Clause 54. The network node of any of clauses 45 to 53, wherein the one or more first PRS resources having the one or more physical layer security properties comprises: the one or more first PRS resources being transmitted as a cyclic prefix orthogonal frequency division multiplexing (CP-OFDM) waveform having an M-sized phase-shift keying (PSK) modulation scheme, where M is greater than or equal to 8.

Clause 55. The network node of clause 54, wherein different values of M are used for different PRS resources, different PRS resource sets, different positioning frequency layers, different frequency bands, different frequency ranges, or any combination thereof.

Clause 56. The network node of any of clauses 45 to 55, wherein the one or more first PRS resources having the one or more physical layer security properties comprises: the one or more first PRS resources having a phase shift determined by a secret key.

Clause 57. The network node of clause 56, wherein the phase shift comprises: a ramp in a frequency domain, one of a set of random phases each generated from the secret key, or one of a set of phases each generated from the secret key.

Clause 58. The network node of clause 57, wherein a size of the set of random phases or a size of the set of phases is recommended by the network node or a location server.

Clause 59. The network node of any of clauses 45 to 58, wherein a type of the one or more physical layer security properties is based on a quality of service (QoS) level for a positioning session between the network node and the network entity during which the network node measures the one or more first PRS resources.

Clause 60. The network node of any of clauses 45 to 59, wherein: the network node is a user equipment (UE), the network entity is a location server, and the one or more first PRS resources are one or more downlink PRS resources.

Clause 61. The network node of any of clauses 45 to 59, wherein: the network node is a first UE, the network entity is a second UE, and the one or more first PRS resources are one or more sidelink PRS resources.

Clause 62. The network node of any of clauses 45 to 59, wherein: the network node is a base station, the network entity is a location server, and the one or more first PRS resources are one or more uplink PRS resources.

Clause 63. A network entity, comprising: means for receiving, from a first network node, a request for transmission of one or more first positioning reference signals (PRS) resources having one or more physical layer security properties; and means for transmitting, to a second network node, a request for the second network node to transmit the one or more first PRS resources having the one or more physical layer security properties to the first network node.

Clause 64. The network entity of clause 63, wherein: the first network node is a user equipment (UE), the second network node is a base station serving the UE, the network entity is a location server, and the one or more first PRS resources are one or more downlink PRS resources.

Clause 65. The network entity of clause 63, wherein: the first network node is a first UE, the second network node is a second UE, the network entity is a base station serving one or both of the first UE and the second UE, and the one or more first PRS resources are one or more sidelink PRS resources.

Clause 66. The network entity of clause 63, wherein: the first network node is a neighboring base station of the UE, the second network node is a UE, the network entity is a serving base station of the UE, and the one or more first PRS resources are one or more uplink PRS resources.

Clause 67. A non-transitory computer-readable medium storing computer-executable instructions that, when executed by a network node, cause the network node to: transmit, to a network entity, a request for transmission of one or more first positioning reference signals (PRS) resources having one or more physical layer security properties, and measure the one or more first PRS resources having the one or more physical layer security properties.

Clause 68. The non-transitory computer-readable medium of clause 67, further comprising computer-executable instructions that, when executed by the network node, cause the network node to: measure one or more second PRS resources; and detect a potential attack in one or more parts of one or more symbol of the one or more second PRS resources, wherein the request for transmission of the one or more first PRS is transmitted in response to detecting the potential attack.

Clause 69. The non-transitory computer-readable medium of clause 68, wherein the one or more first PRS resources have a quasi-colocation (QCL) relation with the one or more second PRS resources, the one or more first PRS resources are associated with a same antenna port as the one or more second PRS resources, or both.

Clause 70. The non-transitory computer-readable medium of any of clauses 68 to 69, further comprising computer-executable instructions that, when executed by the network node, cause the network node to: compare measurements of the one or more first PRS resources to measurements of the one or more second PRS resources; and determine, based on the measurements of the one or more first PRS resources being greater than a threshold different than the measurements of the one or more second PRS resources, that the one or more second PRS resources were subject to an attack.

Clause 71. The non-transitory computer-readable medium of any of clauses 67 to 70, further comprising computer-executable instructions that, when executed by the network node, cause the network node to: receive a configuration of the one or more first PRS resources having the one or more physical layer security properties, the configuration including at least values for the one or more physical layer security properties.

Clause 72. The non-transitory computer-readable medium of clause 71, wherein the configuration is received from a base station via one or more radio resource control (RRC) messages, one or more medium access control control elements (MAC-CEs), or any combination thereof.

Clause 73. The non-transitory computer-readable medium of clause 71, wherein the configuration is received from a location server via one or more Long-Term Evolution (LTE) positioning protocol (LPP) messages.

Clause 74. The non-transitory computer-readable medium of any of clauses 67 to 73, wherein the request for transmission of the one or more first PRS resources includes proposed values for the one or more physical layer security properties.

Clause 75. The non-transitory computer-readable medium of any of clauses 67 to 74, wherein the one or more first PRS resources having the one or more physical layer security properties comprises: the one or more first PRS resources having a comb-1 comb pattern, or the one or more first PRS resources having a comb-N comb pattern with quadrature amplitude modulation (QAM) symbols frequency-division multiplexed in unused resource elements (REs) of the comb-N comb pattern.

Clause 76. The non-transitory computer-readable medium of any of clauses 67 to 75, wherein the one or more first PRS resources having the one or more physical layer security properties comprises: the one or more first PRS resources being transmitted as a cyclic prefix orthogonal frequency division multiplexing (CP-OFDM) waveform having an M-sized phase-shift keying (PSK) modulation scheme, where M is greater than or equal to 8.

Clause 77. The non-transitory computer-readable medium of clause 76, wherein different values of M are used for different PRS resources, different PRS resource sets, different positioning frequency layers, different frequency bands, different frequency ranges, or any combination thereof.

Clause 78, the non-transitory computer-readable medium of any of clauses 67 to 77, wherein the one or more first PRS resources having the one or more physical layer security properties comprises: the one or more first PRS resources having a phase shift determined by a secret key.

Clause 79. The non-transitory computer-readable medium of clause 78, wherein the phase shift comprises: a ramp in a frequency domain, one of a set of random phases each generated from the secret key, or one of a set of phases each generated from the secret key.

Clause 80. The non-transitory computer-readable medium of clause 79, wherein a size of the set of random phases or a size of the set of phases is recommended by the network node or a location server.

Clause 81. The non-transitory computer-readable medium of any of clauses 67 to 80, wherein a type of the one or more physical layer security properties is based on a quality of service (QoS) level for a positioning session between the network node and the network entity during which the network node measures the one or more first PRS resources.

Clause 82. The non-transitory computer-readable medium of any of clauses 67 to 81, wherein: the network node is a user equipment (UE), the network entity is a location server, and the one or more first PRS resources are one or more downlink PRS resources.

Clause 83. The non-transitory computer-readable medium of any of clauses 67 to 81, wherein: the network node is a first UE, the network entity is a second UE, and the one or more first PRS resources are one or more sidelink PRS resources.

Clause 84. The non-transitory computer-readable medium of any of clauses 67 to 81, wherein: the network node is a base station, the network entity is a location server, and the one or more first PRS resources are one or more uplink PRS resources.

Clause 85. A non-transitory computer-readable medium storing computer-executable instructions that, when executed by a network entity, cause the network entity to: receive, from a first network node, a request for transmission of one or more first positioning reference signals (PRS) resources having one or more physical layer security properties; and transmit, to a second network node, a request for the second network node to transmit the one or more first PRS resources having the one or more physical layer security properties to the first network node.

Clause 86. The non-transitory computer-readable medium of clause 85, wherein: the first network node is a user equipment (UE), the second network node is a base station serving the UE, the network entity is a location server, and the one or more first PRS resources are one or more downlink PRS resources.

Clause 87. The non-transitory computer-readable medium of clause 85, wherein: the first network node is a first UE, the second network node is a second UE, the network entity is a base station serving one or both of the first UE and the second UE, and the one or more first PRS resources are one or more sidelink PRS resources.

Clause 88. The non-transitory computer-readable medium of clause 85, wherein: the first network node is a neighboring base station of the UE, the second network node is a UE, the network entity is a serving base station of the UE, and the one or more first PRS resources are one or more uplink PRS resources.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless positioning performed by a network node, comprising:
- transmitting, to a network entity, a request for transmission of one or more first positioning reference signals (PRS) resources having one or more physical layer security properties;
- measuring the one or more first PRS resources having the one or more physical layer security properties;
- measuring one or more second PRS resources; and
- detecting a potential attack in one or more parts of one or more symbol of the one or more second PRS resources,
- wherein the request for transmission of the one or more first PRS is transmitted in response to detecting the potential attack.

2. The method of claim 1, wherein the one or more first PRS resources have a quasi-colocation (QCL) relation with the one or more second PRS resources, the one or more first PRS resources are associated with a same antenna port as the one or more second PRS resources, or both.

3. The method of claim 1, further comprising:
- comparing measurements of the one or more first PRS resources to measurements of the one or more second PRS resources; and
- determining, based on the measurements of the one or more first PRS resources being greater than a threshold different than the measurements of the one or more second PRS resources, that the one or more second PRS resources were subject to an attack.

4. The method of claim 1, further comprising:
- receiving a configuration of the one or more first PRS resources having the one or more physical layer security properties, the configuration including at least values for the one or more physical layer security properties.

5. The method of claim 4, wherein the configuration is received from a base station via one or more radio resource control (RRC) messages, one or more medium access control control elements (MAC-CEs), or any combination thereof.

6. The method of claim 4, wherein the configuration is received from a location server via one or more Long-Term Evolution (LTE) positioning protocol (LPP) messages.

7. The method of claim 1, wherein the request for transmission of the one or more first PRS resources includes proposed values for the one or more physical layer security properties.

8. The method of claim 1, wherein the one or more first PRS resources having the one or more physical layer security properties comprises:
- the one or more first PRS resources having a comb-1 comb pattern, or
- the one or more first PRS resources having a comb-N comb pattern with quadrature amplitude modulation (QAM) symbols frequency-division multiplexed in unused resource elements (REs) of the comb-N comb pattern.

9. The method of claim 1, wherein the one or more first PRS resources having the one or more physical layer security properties comprises:
- the one or more first PRS resources being transmitted as a cyclic prefix orthogonal frequency division multiplexing (CP-OFDM) waveform having an M-sized phase-shift keying (PSK) modulation scheme, where M is greater than or equal to 8.

10. The method of claim 9, wherein different values of M are used for different PRS resources, different PRS resource sets, different positioning frequency layers, different frequency bands, different frequency ranges, or any combination thereof.

11. The method of claim 1, wherein the one or more first PRS resources having the one or more physical layer security properties comprises:
- the one or more first PRS resources having a phase shift determined by a secret key.

12. The method of claim 11, wherein the phase shift comprises:
- a ramp in a frequency domain,
- one of a set of random phases each generated from the secret key, or
- one of a set of phases each generated from the secret key.

13. The method of claim 12, wherein a size of the set of random phases or a size of the set of phases is recommended by the network node or a location server.

14. The method of claim 1, wherein a type of the one or more physical layer security properties is based on a quality of service (QOS) level for a positioning session between the network node and the network entity during which the network node measures the one or more first PRS resources.

15. The method of claim 1, wherein:
the network node is a user equipment (UE),
the network entity is a location server, and
the one or more first PRS resources are one or more downlink PRS resources.

16. The method of claim 1, wherein:
the network node is a first UE,
the network entity is a second UE, and
the one or more first PRS resources are one or more sidelink PRS resources.

17. The method of claim 1, wherein:
the network node is a base station,
the network entity is a location server, and
the one or more first PRS resources are one or more uplink PRS resources.

18. A method of communication performed by a network entity, comprising:
receiving, from a first network node, a request for transmission of one or more first positioning reference signals (PRS) resources having one or more physical layer security properties; and
transmitting, to a second network node, a request for the second network node to transmit the one or more first PRS resources having the one or more physical layer security properties to
the first network node,
wherein:
the first network node is a first UE,
the second network node is a second UE,
the network entity is a base station serving one or both of the first UE and the second UE, and
the one or more first PRS resources are one or more sidelink PRS resources.

19. A network node, comprising:
a memory;
at least one transceiver; and
at least one processor communicatively coupled to the memory and the at least one transceiver, the at least one processor configured to:
transmit, via the at least one transceiver, to a network entity, a request for transmission of one or more first positioning reference signals (PRS) resources having one or more physical layer security properties;
measure the one or more first PRS resources having the one or more physical layer security properties;
measure one or more second PRS resources; and
detect a potential attack in one or more parts of one or more symbol of the one or more second PRS resources,
wherein the request for transmission of the one or more first PRS is transmitted in response to detecting the potential attack.

20. The network node of claim 19, wherein the at least one processor is further configured to: receive, via the at least one transceiver, a configuration of the one or more first PRS resources having the one or more physical layer security properties, the configuration including at least values for the one or more physical layer security properties.

21. The network node of claim 19, wherein the one or more first PRS resources having the one or more physical layer security properties comprises: the one or more first PRS resources having a comb-1 comb pattern, or the one or more first PRS resources having a comb-N comb pattern with quadrature amplitude modulation (QAM) symbols frequency-division multiplexed in unused resource elements (REs) of the comb-N comb pattern.

22. The network node of claim 19, wherein the one or more first PRS resources having the one or more physical layer security properties comprises: the one or more first PRS resources being transmitted as a cyclic prefix orthogonal frequency division multiplexing (CP-OFDM) waveform having an M-sized phase-shift keying (PSK) modulation scheme, where M is greater than or equal to 8.

23. The network node of claim 19, wherein the one or more first PRS resources having the one or more physical layer security properties comprises: the one or more first PRS resources having a phase shift determined by a secret key.

24. The network node of claim 19, wherein a type of the one or more physical layer security properties is based on a quality of service (QOS) level for a positioning session between the network node and the network entity during which the network node measures the one or more first PRS resources.

25. A network entity, comprising:
a memory;
at least one transceiver; and
at least one processor communicatively coupled to the memory and the at least one transceiver, the at least one processor configured to:
receive, via the at least one transceiver, from a first network node, a request for transmission of one or more first positioning reference signals (PRS) resources having one or more physical layer security properties; and
transmit, via the at least one transceiver, to a second network node, a request for the second network node to transmit the one or more first PRS resources having the one or more physical layer security properties to the first network node, wherein:
the first network node is a first UE,
the second network node is a second UE,
the network entity is a base station serving one or both of the first UE and the second UE, and
the one or more first PRS resources are one or more sidelink PRS resources.

* * * * *